(12) United States Patent
Yin et al.

(10) Patent No.: US 8,885,882 B1
(45) Date of Patent: Nov. 11, 2014

(54) REAL TIME EYE TRACKING FOR HUMAN COMPUTER INTERACTION

(75) Inventors: Lijun Yin, Vestal, NY (US); Michael Reale, Vestal, NY (US)

(73) Assignee: The Research Foundation for The State University of New York, Binghamton, NY (US)

(*) Notice: Subject to any disclaimer, the term of this patent is extended or adjusted under 35 U.S.C. 154(b) by 191 days.

(21) Appl. No.: 13/549,730

(22) Filed: Jul. 16, 2012

Related U.S. Application Data

(60) Provisional application No. 61/507,780, filed on Jul. 14, 2011.

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | |
|---|---|---|---|
| 368,913 | A | 9/1972 | Young et al. |
| 4,075,657 | A | 2/1978 | Weinblatt |
| 4,102,564 | A | 7/1978 | Michael |
| 4,145,122 | A | 3/1979 | Rinard et al. |
| 4,303,394 | A | 12/1981 | Berke et al. |
| 4,641,349 | A | 2/1987 | Flom et al. |
| 4,651,145 | A | 3/1987 | Sutter |
| 4,702,575 | A | 10/1987 | Breglia |
| 4,755,045 | A | 7/1988 | Borah et al. |
| 4,836,670 | A | 6/1989 | Hutchinson |
| 4,973,149 | A | 11/1990 | Hutchinson |
| 4,975,969 | A | 12/1990 | Tal |
| 5,008,946 | A | 4/1991 | Ando |
| 5,016,282 | A | 5/1991 | Tomono et al. |
| 5,231,674 | A | 7/1993 | Cleveland et al. |
| 5,287,437 | A | 2/1994 | Deering |

(Continued)

FOREIGN PATENT DOCUMENTS

| | | |
|---|---|---|
| JP | 2003015816 | 1/2003 |
| JP | 2004504684 | 2/2004 |

(Continued)

OTHER PUBLICATIONS

Steifelhagen et al. "Tracking Eyes and Monitoring Eye Gaze", Interactive Systems Laboratories, University of Karlsruhe, Germany, 1997.*

(Continued)

*Primary Examiner* — Barry Drennan
*Assistant Examiner* — Samah Beg
(74) *Attorney, Agent, or Firm* — Steven M. Hoffberg; Ostrolenk Faber LLP

(57) ABSTRACT

A gaze direction determining system and method is provided. A two-camera system may detect the face from a fixed, wide-angle camera, estimates a rough location for the eye region using an eye detector based on topographic features, and directs another active pan-tilt-zoom camera to focus in on this eye region. A eye gaze estimation approach employs point-of-regard (PoG) tracking on a large viewing screen. To allow for greater head pose freedom, a calibration approach is provided to find the 3D eyeball location, eyeball radius, and fovea position. Both the iris center and iris contour points are mapped to the eyeball sphere (creating a 3D iris disk) to get the optical axis; then the fovea rotated accordingly and the final, visual axis gaze direction computed.

29 Claims, 8 Drawing Sheets

(56) References Cited

U.S. PATENT DOCUMENTS

| | | | |
|---|---|---|---|
| 5,325,133 A | 6/1994 | Adachi | |
| 5,331,149 A | 7/1994 | Spitzer et al. | |
| 5,345,281 A | 9/1994 | Taboada et al. | |
| 5,360,971 A | 11/1994 | Kaufman et al. | |
| 5,428,413 A | 6/1995 | Shindo | |
| 5,471,542 A * | 11/1995 | Ragland | 382/128 |
| 5,481,622 A | 1/1996 | Gerhardt et al. | |
| 5,583,795 A | 12/1996 | Smyth | |
| 5,638,176 A | 6/1997 | Hobbs et al. | |
| 5,649,061 A | 7/1997 | Smyth | |
| 5,668,622 A | 9/1997 | Charbonnier et al. | |
| 5,726,916 A | 3/1998 | Smyth | |
| 5,797,046 A | 8/1998 | Nagano et al. | |
| 5,805,167 A | 9/1998 | van Cruyningen | |
| 5,818,954 A | 10/1998 | Tomono et al. | |
| 5,898,423 A | 4/1999 | Tognazzini et al. | |
| 5,912,721 A | 6/1999 | Yamaguchi et al. | |
| 5,926,251 A | 7/1999 | Okumura | |
| 5,984,475 A | 11/1999 | Galiana et al. | |
| 5,991,085 A | 11/1999 | Rallison et al. | |
| 6,120,461 A | 9/2000 | Smyth | |
| 6,152,563 A | 11/2000 | Hutchinson et al. | |
| 6,154,559 A | 11/2000 | Beardsley | |
| 6,163,336 A | 12/2000 | Richards | |
| 6,204,828 B1 | 3/2001 | Amir et al. | |
| 6,215,898 B1 | 4/2001 | Woodfill et al. | |
| 6,220,706 B1 | 4/2001 | Foley | |
| 6,243,076 B1 | 6/2001 | Hatfield | |
| 6,246,779 B1 | 6/2001 | Fukui et al. | |
| 6,299,307 B1 | 10/2001 | Oltean et al. | |
| 6,323,884 B1 | 11/2001 | Bird et al. | |
| 6,369,952 B1 | 4/2002 | Rallison et al. | |
| 6,381,339 B1 | 4/2002 | Brown et al. | |
| 6,393,136 B1 | 5/2002 | Amir et al. | |
| 6,397,137 B1 | 5/2002 | Alpert et al. | |
| 6,456,737 B1 | 9/2002 | Woodfill et al. | |
| 6,477,267 B1 | 11/2002 | Richards | |
| 6,478,425 B2 | 11/2002 | Trajkovic et al. | |
| 6,546,121 B1 | 4/2003 | Oda | |
| 6,568,809 B2 | 5/2003 | Trajkovic et al. | |
| 6,578,962 B1 | 6/2003 | Amir et al. | |
| 6,603,504 B1 | 8/2003 | Son et al. | |
| 6,608,615 B1 | 8/2003 | Martins | |
| 6,634,749 B1 | 10/2003 | Morrison et al. | |
| 6,659,611 B2 | 12/2003 | Amir et al. | |
| 6,727,866 B2 | 4/2004 | Wang et al. | |
| 6,753,847 B2 | 6/2004 | Kurtenbach et al. | |
| 6,843,564 B2 | 1/2005 | Putilin et al. | |
| 6,853,854 B1 | 2/2005 | Proniewicz et al. | |
| 6,943,754 B2 | 9/2005 | Aughey et al. | |
| 6,989,754 B2 | 1/2006 | Kisacanin et al. | |
| 6,999,071 B2 | 2/2006 | Balogh | |
| 7,040,759 B2 | 5/2006 | Chernyak et al. | |
| 7,043,056 B2 * | 5/2006 | Edwards et al. | 382/103 |
| 7,076,118 B1 | 7/2006 | Westerman | |
| 7,084,838 B2 | 8/2006 | Yoon | |
| 7,090,348 B2 | 8/2006 | Nason et al. | |
| 7,091,931 B2 | 8/2006 | Yoon | |
| 7,138,997 B2 | 11/2006 | Balakrishnan et al. | |
| 7,161,596 B2 | 1/2007 | Hoile | |
| 7,190,825 B2 | 3/2007 | Yoon | |
| 7,197,165 B2 | 3/2007 | Ryan | |
| 7,239,293 B2 | 7/2007 | Perlin et al. | |
| 7,306,337 B2 | 12/2007 | Ji et al. | |
| 7,307,609 B2 | 12/2007 | Chang | |
| 7,315,324 B2 | 1/2008 | Cleveland et al. | |
| 7,324,085 B2 | 1/2008 | Balakrishnan et al. | |
| 7,331,929 B2 | 2/2008 | Morita et al. | |
| 7,345,664 B2 | 3/2008 | Chang | |
| 7,388,580 B2 | 6/2008 | Birdwell | |
| 7,391,887 B1 | 6/2008 | Durnell | |
| 7,396,129 B2 | 7/2008 | Endrikhovski et al. | |
| 7,401,920 B1 | 7/2008 | Kranz et al. | |
| 7,423,540 B2 | 9/2008 | Kisacanin | |
| 7,428,001 B2 | 9/2008 | Schowengerdt et al. | |
| 7,448,751 B2 | 11/2008 | Kiderman et al. | |
| 7,460,940 B2 | 12/2008 | Larsson et al. | |
| 7,490,941 B2 | 2/2009 | Mintz et al. | |
| 7,501,995 B2 | 3/2009 | Morita et al. | |
| 7,503,653 B2 | 3/2009 | Endrikhovski et al. | |
| 7,520,614 B2 | 4/2009 | Joos et al. | |
| 7,528,823 B2 | 5/2009 | Balakrishnan et al. | |
| 7,538,744 B1 * | 5/2009 | Liu et al. | 345/7 |
| 7,538,746 B2 | 5/2009 | Uhlhorn et al. | |
| 7,542,210 B2 | 6/2009 | Chirieleison, Sr. | |
| 7,554,541 B2 | 6/2009 | Fitzmaurice et al. | |
| 7,556,377 B2 | 7/2009 | Beymer | |
| 7,567,702 B2 | 7/2009 | Woodfill et al. | |
| 7,572,008 B2 | 8/2009 | Elvesjo et al. | |
| 7,583,252 B2 | 9/2009 | Kurtenbach et al. | |
| 7,600,873 B2 | 10/2009 | Grundig | |
| 7,620,216 B2 | 11/2009 | Hammoud | |
| 7,626,569 B2 | 12/2009 | Lanier | |
| 7,633,493 B2 | 12/2009 | Syeda-Mahmood et al. | |
| 7,650,034 B2 | 1/2010 | Hammoud | |
| 7,665,845 B2 | 2/2010 | Kiderman et al. | |
| 7,693,256 B2 | 4/2010 | Brahme et al. | |
| 7,701,441 B2 | 4/2010 | Balakrishnan et al. | |
| 7,702,660 B2 | 4/2010 | Chan et al. | |
| 7,703,921 B2 | 4/2010 | Dick et al. | |
| 7,705,876 B2 | 4/2010 | Starkweather et al. | |
| 7,706,575 B2 | 4/2010 | Liu et al. | |
| 7,724,251 B2 | 5/2010 | Balakrishnan et al. | |
| 7,731,360 B2 | 6/2010 | MacDougall et al. | |
| 7,742,623 B1 | 6/2010 | Moon et al. | |
| 7,753,523 B2 | 7/2010 | Kiderman et al. | |
| 7,762,665 B2 | 7/2010 | Vertegaal et al. | |
| 7,766,479 B2 | 8/2010 | Ebisawa | |
| 7,768,528 B1 | 8/2010 | Edwards et al. | |
| 7,787,009 B2 | 8/2010 | Alpaslan et al. | |
| 7,801,686 B2 | 9/2010 | Hyde et al. | |
| 7,809,160 B2 | 10/2010 | Vertegaal et al. | |
| 7,810,926 B2 | 10/2010 | Connell, II | |
| 7,815,507 B2 | 10/2010 | Parrott et al. | |
| 7,819,525 B2 | 10/2010 | Connell, II | |
| 7,834,912 B2 | 11/2010 | Yoshinaga et al. | |
| 7,839,400 B2 | 11/2010 | Kurtenbach et al. | |
| 7,857,452 B2 | 12/2010 | Martinez-Conde et al. | |
| 7,860,382 B2 | 12/2010 | Grip | |
| 7,862,172 B2 | 1/2011 | Yoshinaga et al. | |
| 7,866,818 B2 | 1/2011 | Schroeder et al. | |
| 7,869,848 B2 | 1/2011 | Proniewicz et al. | |
| 7,872,635 B2 | 1/2011 | Mitchell | |
| 7,880,739 B2 | 2/2011 | Long et al. | |
| 7,916,977 B2 | 3/2011 | Kondo et al. | |
| 7,925,077 B2 | 4/2011 | Woodfill et al. | |
| 7,938,540 B2 | 5/2011 | Brentnall, III et al. | |
| 7,948,451 B2 | 5/2011 | Gustafsson et al. | |
| 7,963,652 B2 | 6/2011 | Vertegaal et al. | |
| 7,970,179 B2 | 6/2011 | Tosa | |
| 7,974,787 B2 | 7/2011 | Hyde et al. | |
| 7,983,733 B2 | 7/2011 | Viswanathan | |
| 7,986,318 B2 | 7/2011 | Kurtenbach et al. | |
| 7,999,844 B2 | 8/2011 | Richards | |
| 8,014,571 B2 | 9/2011 | Friedman et al. | |
| 8,020,993 B1 | 9/2011 | Fram | |
| 8,065,240 B2 | 11/2011 | Jung et al. | |
| 8,069,125 B2 | 11/2011 | Jung et al. | |
| 8,077,217 B2 | 12/2011 | Miyamoto | |
| 8,077,914 B1 | 12/2011 | Kaplan | |
| D653,245 S | 1/2012 | Buzzard et al. | |
| 8,099,748 B2 | 1/2012 | Ritter et al. | |
| 8,100,532 B2 | 1/2012 | Yoo et al. | |
| 8,121,356 B2 | 2/2012 | Friedman et al. | |
| D655,279 S | 3/2012 | Buzzard et al. | |
| 8,130,260 B2 | 3/2012 | Krill et al. | |
| 8,150,796 B2 | 4/2012 | Jung et al. | |
| 8,154,781 B2 | 4/2012 | Kroll et al. | |
| 8,155,479 B2 | 4/2012 | Hoffman et al. | |
| 8,170,293 B2 | 5/2012 | Tosa et al. | |
| 8,175,374 B2 | 5/2012 | Pinault et al. | |
| 8,195,593 B2 | 6/2012 | Jung et al. | |
| 8,199,186 B2 | 6/2012 | Florencio et al. | |
| 8,219,438 B1 | 7/2012 | Moon et al. | |

(56) References Cited

U.S. PATENT DOCUMENTS

| | | | |
|---|---|---|---|
| 8,457,352 B2* | 6/2013 | Hennessey et al. | 382/103 |
| 2003/0098954 A1 | 5/2003 | Amir et al. | |
| 2003/0123027 A1 | 7/2003 | Amir et al. | |
| 2004/0174496 A1 | 9/2004 | Ji et al. | |
| 2004/0239509 A1 | 12/2004 | Kisacanin et al. | |
| 2005/0073136 A1 | 4/2005 | Larsson et al. | |
| 2005/0175218 A1 | 8/2005 | Vertegaal et al. | |
| 2005/0288564 A1 | 12/2005 | Iuliano | |
| 2006/0028400 A1 | 2/2006 | Lapstun et al. | |
| 2006/0110008 A1 | 5/2006 | Vertegaal et al. | |
| 2006/0227103 A1 | 10/2006 | Koo et al. | |
| 2008/0002262 A1 | 1/2008 | Chirieleison | |
| 2008/0287821 A1 | 11/2008 | Jung et al. | |
| 2009/0018407 A1 | 1/2009 | Jung et al. | |
| 2009/0024050 A1 | 1/2009 | Jung et al. | |
| 2009/0110245 A1 | 4/2009 | Thorn | |
| 2009/0112616 A1 | 4/2009 | Jung et al. | |
| 2009/0112617 A1 | 4/2009 | Jung et al. | |
| 2009/0112620 A1 | 4/2009 | Jung et al. | |
| 2009/0112621 A1 | 4/2009 | Jung et al. | |
| 2009/0118593 A1 | 5/2009 | Jung et al. | |
| 2009/0119154 A1 | 5/2009 | Jung et al. | |
| 2009/0132275 A1 | 5/2009 | Jung et al. | |
| 2009/0156907 A1 | 6/2009 | Jung et al. | |
| 2009/0156955 A1 | 6/2009 | Jung et al. | |
| 2009/0157323 A1 | 6/2009 | Jung et al. | |
| 2009/0157481 A1 | 6/2009 | Jung et al. | |
| 2009/0157482 A1 | 6/2009 | Jung et al. | |
| 2009/0157625 A1 | 6/2009 | Jung et al. | |
| 2009/0157660 A1 | 6/2009 | Jung et al. | |
| 2009/0157751 A1 | 6/2009 | Jung et al. | |
| 2009/0157813 A1 | 6/2009 | Jung et al. | |
| 2009/0163777 A1 | 6/2009 | Jung et al. | |
| 2009/0164131 A1 | 6/2009 | Jung et al. | |
| 2009/0164132 A1 | 6/2009 | Jung et al. | |
| 2009/0164302 A1 | 6/2009 | Jung et al. | |
| 2009/0164401 A1 | 6/2009 | Jung et al. | |
| 2009/0164403 A1 | 6/2009 | Jung et al. | |
| 2009/0164458 A1 | 6/2009 | Jung et al. | |
| 2009/0164503 A1 | 6/2009 | Jung et al. | |
| 2009/0164549 A1 | 6/2009 | Jung et al. | |
| 2009/0171164 A1 | 7/2009 | Jung et al. | |
| 2009/0172540 A1 | 7/2009 | Jung et al. | |
| 2009/0219484 A1 | 9/2009 | Ebisawa | |
| 2009/0318773 A1 | 12/2009 | Jung et al. | |
| 2010/0013949 A1* | 1/2010 | Miyamoto | 348/222.1 |
| 2010/0033333 A1 | 2/2010 | Victor et al. | |
| 2010/0039617 A1 | 2/2010 | Martinez-Conde et al. | |
| 2010/0086200 A1 | 4/2010 | Stankiewicz et al. | |
| 2010/0086221 A1 | 4/2010 | Stankiewicz et al. | |
| 2010/0086278 A1 | 4/2010 | Stankiewicz et al. | |
| 2010/0149073 A1 | 6/2010 | Chaum et al. | |
| 2010/0208205 A1 | 8/2010 | Tseng et al. | |
| 2010/0280372 A1 | 11/2010 | Poolman et al. | |
| 2010/0295774 A1 | 11/2010 | Hennessey | |
| 2011/0007275 A1 | 1/2011 | Yoo et al. | |
| 2011/0018903 A1 | 1/2011 | Lapstun et al. | |
| 2011/0170059 A1* | 7/2011 | Ehrmann et al. | 351/205 |
| 2011/0170065 A1 | 7/2011 | Sugio et al. | |
| 2011/0178784 A1 | 7/2011 | Sato et al. | |
| 2011/0182472 A1 | 7/2011 | Hansen | |
| 2011/0228975 A1* | 9/2011 | Hennessey et al. | 382/103 |
| 2012/0026276 A1 | 2/2012 | Czyzewski et al. | |
| 2012/0050493 A1* | 3/2012 | Ernst et al. | 348/47 |
| 2012/0092618 A1 | 4/2012 | Yoo et al. | |
| 2012/0105486 A1 | 5/2012 | Lankford et al. | |
| 2012/0116559 A1 | 5/2012 | Davis et al. | |
| 2012/0120498 A1 | 5/2012 | Harrison et al. | |
| 2012/0120499 A1 | 5/2012 | Harrison et al. | |
| 2012/0133889 A1 | 5/2012 | Bergt et al. | |
| 2012/0134548 A1 | 5/2012 | Rhoads et al. | |
| 2012/0154633 A1 | 6/2012 | Rodriguez | |
| 2012/0154920 A1 | 6/2012 | Harrison et al. | |
| 2012/0164613 A1 | 6/2012 | Jung et al. | |
| 2013/0083976 A1* | 4/2013 | Ragland | 382/117 |
| 2013/0154913 A1* | 6/2013 | Genc et al. | 345/156 |
| 2013/0243258 A1* | 9/2013 | HENNESSEY et al. | 382/103 |
| 2013/0329957 A1* | 12/2013 | Ebisawa | 382/103 |
| 2014/0111630 A1* | 4/2014 | Pires et al. | |

FOREIGN PATENT DOCUMENTS

| | | |
|---|---|---|
| JP | 2005230049 | 9/2005 |
| JP | 2006328548 | 12/2006 |
| JP | 2007055941 | 3/2007 |
| JP | 2007073273 | 3/2007 |
| WO | WO0209025 | 1/2002 |
| WO | WO2004045399 | 6/2004 |
| WO | WO2008069158 | 6/2008 |
| WO | WO2008141460 | * 11/2008 |

OTHER PUBLICATIONS

Wang et al. "Using Geometric Properties of Topographic Manifold to Detect and Track Eyes for Human-Computer Interaction", ACM Transactions on Multimedia Computing, Dec. 2007, vol. 3(4): pp. 1-20.*

V. Vezhnevets and A. Degtiareva, "Robust and Accurate Eye Contour Extraction", GraphiCon, 2003, pp. 81-84.*

Wu et al. "Tracking Iris Contour with a 3D Eye-Model for Gaze Estimation", ACCV 2007, pp. 688-697.*

H. Grabner and H. Bischof, "On-line Boosting and Vision", IEEE 2006, pp. 260-267.*

Robert J. K. Jacob et al, Eye Tracking in Human—Computer Interaction and Usability Research: Ready to Deliver the Promises, Oxford, England, 2003.

Qiang Ji et al, Non-Intrusive Eye and Gaze Tracking for Natural Human Computer Interaction, Troy, NY, 2003.

Sheng-Wen Shih et al, A Novel Approach to 3-D Gaze Tracking Using Stereo Cameras, Feb. 2004.

Rainer Stiefelhagen et al, Head Orientation and Gaze Direction in Meetings, Germany, 2002.

Rowel Atienza et al, Active Gaze Tracking for Human-Robot Interaction, Australia, 2002.

Frank Wallhoff et al, Multimodal Face Detection, Head Orientation and Eye Gaze Tracking, Munchen, Germany, 2006.

Andrew T. Duchowski, A Breadth-First Survey of Eye Tracking Applications, 2002.

Slavko Milekic, The More you Look the More You Get: Intention-based Interface Using Gaze-Tracking, 2003.

Carlos Morimoto et al, Keeping an Eye for HCI, Brazil, Oct. 1999.

David Beymer et al, WebGazeAnalyzer: A System for Capturing and Analyzing Web Reading Behavior Using Eye Gaze, San Jose, CA, 2005.

Takehiko Ohno et al, FreeGaze: A Gaze Tracking System for Everyday Gaze Interaction, Japan, 2002.

Qiang Ji et al, Real-Time Eye, Gaze, and Face Pose Tracking for Monitoring Driver Vigilance, Troy, NY 2002.

Takahiro Ishikawa et al, Passive Driver Gaze Tracking with Active Appearance Models, 2004.

Dario D. Salvucci et al, Identifying Fixations and Saccades in Eye-Tracking Protocols, Cambridge, MA, 2000.

Andrew Gee et al, Non-Intrusive Gaze Tracking for Human-Computer Interaction, Australia, 1994.

Rainer Stiefelhagen, Gaze Tracking for Multimodal Human-Computer Interaction, Sep. 12, 1996.

Zhiwei Zhu et al, Novel Eye Gaze Tracking Techniques Under Natural Head Movement, 2006.

Jochen Heinzmann et al, 3-D Facial Pose and Gaze Point Estimation using a Robust Real-Time Tracking Paradigm, Australia, 1998.

Linda E. Sibert, et al, Evaluation of Eye Gaze Interaction, Washington, DC, 2000.

R. Alex Colburn et al, The Role of Eye Gaze in Avatar Mediated Conversational Interfaces, Jul. 31, 2000.

Shumeet Baluja et al, Non-Intrusive Gaze Tracking Using Artificial Neural Networks, Jan. 5, 1994.

Sheng-Wen Shih et al, A Calibration-Free Gaze Tracking Technique, Taiwan, 2000.

(56) References Cited

OTHER PUBLICATIONS

Jie Yang et al, Real-Time Face and Facial Feature Tracking and Applications, Pittsburgh, PA, 1998.
A. H. Gee et al, Determining the Gaze of Faces in Images, Cambridge, England, Mar. 1994.
Barton A. Smith et al, Hand Eye Coordination Patterns in Target Selection, San Jose, CA , 2000.
Kyung-Nam Kim et al, Vision-Based Eye-Gaze Tracking for Human Computer Interface, Korea, 1999.
Robert J.K. Jacob, Eye Tracking in Advanced Interface Design, Washington, D.C., 1995.
A. Perez et al, A Precise Eye-Gaze Detection and Tracking System, Czech Republic, Feb. 3-7, 2003.
Roel Vertegaal et al, Eye Gaze Patterns in Conversations: There is More to Conversational Agents Than Meets the Eyes, Seattle, WA, Mar. 31-Apr. 4, 2001.
Takehiko Ohno et al, Just Blink Your Eyes: A Head-Free Gaze Tracking System, Ft. Lauderdale, FL, Apr. 5-10, 2003.
Jingtao Wang et al, Chinese Input with Keyboard and Eye-Tracking—An Anatomical Study, Seattle, WA, Mar. 31-Apr. 4, 2001.
Rainer Stiefelhagen, Tracking Focus of Attention in Meetings, Germany, 2002.
Maia Garau et al, The Impact of Avatar Realism and Eye Gaze Control on Perceived Quality of Communication in a Shared Immersive Virtual Environment, Ft. Lauderdale, FL, Apr. 5-10, 2003.
Zhiwei Zhu et al, Eye and Gaze Tracking for Interactive Graphic Display, Machine Vision and Applications (2004) 15:139-148.
Rainer Stiefelhagen et al, Tracking Eye and Monitoring Eye Gaze, Germany, 1997.
Akira Sugioka et al, Noncontact Video-Based Eye-Gaze Detection Method Allowing Large Head Displacements, Amsterdam, 1996.
Carlos Morimoto et al, Pupil Detection and Tracking Using Multiple Light Sources, San Jose, CA 2000.
Shumin Zhai et al, Manual and Gaze Input Cascaded (MAGIC) Pointing, San Jose, CA 1999.
Dongheng Li et al, Starburst: A Hybrid Algorithm for Video-Based Eye Tracking Combining Feature-Based and Model-Based Approaches, Ames, Iowa, 2005.
E. C. Lyons et al, Development of a Hybrid Hands-Off Human Computer Interface Based on Electromyogram Signals and Eye-Gaze Tracking, Miami, Florida, 2001.
Zhiwei Zhu et al, Eye Gaze Tracking Under Natural Head Movements, Troy, NY, 2005.
Yoshio Matsumoto et al, An Algorithm for Read-Time Stereo Vision Implementation of Head Pose and Gaze Direction Measurement, Nara, Japan, 2000.
Flavio Luiz, et al, Free Head Motion Eye Gaze Tracking Using a Single Camera and Multiple Light Sources, Sao Paulo, Brazil, 2006.
Frans W. Cornelissen et al, The Eyelink Toolbox: Eye Tracking with MATLAB and the Psychophysics Toolbox, The Netherlands, Jul. 19, 2002.
Benjamin Law et al, Eye Gaze Patterns Differentiate Novice and Experts in a Virtual Laparoscopic Surgery Training Environment, 2004.
Jixu Chen et al, A Robust 3D Eye Gaze Tracking System Using Noise Reduction, Troy, NY 2008.
Han Collewijn et al, Effect of Freeing the Head on Eye Movement Characteristics During Three-Dimensional Shifts of Gaze and Tracking, 1992.
Craig A. Chin et al, Integrated Electromyogram and Eye-Gaze Tracking Cursor Control System for Computer Users with Motor Disabilities, Florida, vol. 45, No. 1, 2008.
Jefferson E. Roy et al, Brain Stem Pursuit Pathways: Dissociating Visual, Vestibular, and Proprioceptive Inputs During Combined Eye-Head Gaze Tracking, May 6, 2011.
Rainer Stiefelhagen et al, A Model-Based Gaze Tracking System, Germany, 1996.
Roel Vertegaal et al, Explaining Effects of Eye Gaze on Mediated Group Conversations: Amount or Synchronization?, Ontario, Canada, 2002.
David Beymer et al, Eye Gaze Tracking Using an Active Stereo Head, San Jose, CA, 2003.
Kar-Han Tan et al, Appearance-based Eye Gaze Estimation, Chicago, IL, 2002.
Pernilla Qvarfordt et al, Conversing with the User Based on Eye-Gaze Patterns, Portland, OR, Apr. 27-7, 2005.
Jian-Gang Wang et al, Eye Gaze Estimation from a Single Image of One Eye, 2003.
John L. Sibert et al, The Reading Assistant: Eye Gaze Triggered Auditory Prompting for Reading Remediation, San Diego, CA 2000.
Maia Garau et al, The Impact of Eye Gaze on Communication Using Humanoid Avatars, London, 2001.
Alex Poole et al, Eye Tracking in Human-Computer Interaction and Usability Research: Current Status and Future Prospects, UK, 2006.
Jie Zhu et al, Subpixel Eye Gaze Tracking, Pittsburgh, PA, 2002.

* cited by examiner

REAL TIME EYE TRACKING FOR HUMAN COMPUTER INTERACTION

CROSS REFERENCE TO RELATED APPLICATIONS

The present application claims benefit of priority from U.S. Provisional Patent Application Ser. No. 61/507,780, filed Jul. 14, 2011, the entirety of which is expressly incorporated herein by reference.

GOVERNMENT RIGHTS CLAUSE

This invention was made with government support under FA8750-08-0096 awarded by the United States Air Force. The government has certain rights in the invention.

BACKGROUND OF THE INVENTION

The ideal human-computer interaction system should function robustly with as few constraints as those found in human-to-human interaction. One of the most effective means of interaction is through the behavior of the eye. Specifically, knowledge of the viewing direction and thus the area of regard offers insight into the user's intention and mental focus, and consequently this information is vital for the next generation of user interfaces [21][22]. Applications in this vein can be found in the fields of HCI, security, advertising, psychology, and many others [5][21].

As such, there has been intensive research on eye tracking and gaze estimation for the past 30 years [5]. However, with the conventional single-camera system, either the user must keep his or her head locked in place (so that it remains within the narrow field of view), the camera must be strapped to the subject's head (a common approach for eye detection), or some other marker (like a small infrared light) must be worn by the subject [2]. The resulting situation can be prodigiously inconvenient and uncomfortable for the user. Because of the unique reflective properties of the pupil to infrared (IR) light, some systems have opted to detect the face by first finding the eyes [2][10][11]. While robust to visible light conditions, these methods have issues with changes in head pose, reflections off glasses, and even decreased reflectivity of the retina from contact lenses [9]. An alternative approach is to use stereo cameras [2][11]; while robust, these systems generally require substantial calibration time. Some complex systems (like "smart rooms" [1]) require expensive and/or non-portable setups. Even existing, non-stereo, two-camera systems [16] often restrict the user to a preset location in the room.

The overwhelming majority of gaze estimation approaches rely on glints (the reflection of light off the cornea) to construct 2D or 3D gaze models [5]. Alternatively, eye gaze may be determined from the pupil or iris contours [18] using ellipse fitting approaches [3][15]. One can also leverage the estimated iris center directly and use its distance from some reference point (e.g., the eye corners) for gaze estimation [12][19]. Indeed, the entire eye region may be segmented into the iris, sclera (white of the eye), and the surrounding skin; the resulting regions can then be matched pixel-wise with 3D rendered eyeball models (with different parameters) [17][20]. However, different subjects, head pose changes, and lighting conditions could significantly diminish the quality of the segmentation [20].

U.S. Pat. No. 8,077,217 provides an eyeball parameter estimating device and method, for estimating, from a camera image, as eyeball parameters, an eyeball central position and an eyeball radius which are required to estimate a line of sight of a person in the camera image. An eyeball parameter estimating device includes: a head posture estimating unit for estimating, from a face image of a person photographed by a camera, position data corresponding to three degrees of freedom (x-, y-, z-axes) in a camera coordinate system, of an origin in a head coordinate system and rotation angle data corresponding to three degrees of freedom (x-, y-, z-axes) of a coordinate axis of the head coordinate system relative to a coordinate axis of the camera coordinate system, as head posture data in the camera coordinate system; a head coordinate system eyeball central position candidate setting unit for setting candidates of eyeball central position data in the head coordinate system based on coordinates of two feature points on an eyeball, which are preliminarily set in the head coordinate system; a camera coordinate system eyeball central position calculating unit for calculating an eyeball central position in the camera coordinate system based on the head posture data, the eyeball central position candidate data, and pupil central position data detected from the face image; and an eyeball parameter estimating unit for estimating an eyeball central position and an eyeball radius based on the eyeball central position in the camera coordinate system so as to minimize deviations of position data of a point of gaze, a pupil center, and an eyeball center from a straight line joining original positions of the three pieces of position data.

U.S. Pat. No. 7,306,337, expressly incorporated herein by reference, determines eye gaze parameters from eye gaze data, including analysis of a pupil-glint displacement vector from the center of the pupil image to the center of the glint in the image plane. The glint is a small bright spot near the pupil image resulting from a reflection of infrared light from a an infrared illuminator off the surface of the cornea.

U.S. Pat. Pub. 2011/0228975, expressly incorporated herein by reference, determines a point-of-gaze of a user in three dimensions, by presenting a three-dimensional scene to both eyes of the user; capturing image data including both eyes of the user; estimating line-of-sight vectors in a three-dimensional coordinate system for the user's eyes based on the image data; and determining the point-of-gaze in the three-dimensional coordinate system using the line-of-sight vectors. It is assumed that the line-of-sight vector originates from the center of the cornea estimated in space from image data. The image data may be processed to analyze multiple glints (Purkinje reflections) of each eye.

U.S. Pat. No. 6,659,611, expressly incorporated herein by reference, provides eye gaze tracking without calibrated cameras, direct measurements of specific users' eye geometries, or requiring the user to visually track a cursor traversing a known trajectory. One or more uncalibrated cameras imaging the user's eye and having on-axis lighting, capture images of a test pattern in real space as reflected from the user's cornea, which acts as a convex spherical mirror. Parameters required to define a mathematical mapping between real space and image space, including spherical and perspective transformations, are extracted, and subsequent images of objects reflected from the user's eye through the inverse of the mathematical mapping are used to determine a gaze vector and a point of regard.

U.S. Pat. No. 5,818,954 expressly incorporated herein by reference, provides a method that calculates a position of the center of the eyeball as a fixed displacement from an origin of a facial coordinate system established by detection of three points on the face, and computes a vector therefrom to the center of the pupil. The vector and the detected position of the pupil are used to determine the visual axis.

U.S. Pat. No. 7,963,652, expressly incorporated herein by reference, provides eye gaze tracking without camera calibration, eye geometry measurement, or tracking of a cursor image on a screen by the subject through a known trajectory. See also, U.S. Pat. No. 7,809,160, expressly incorporated herein by reference. One embodiment provides a method for tracking a user's eye gaze at a surface, object, or visual scene, comprising: providing an imaging device for acquiring images of at least one of the user's eyes: modeling, measuring, estimating, and/or calibrating for the user's head position: providing one or more markers associated with the surface, object, or visual scene for producing corresponding glints or reflections in the user's eyes; analyzing the images to find said glints or reflections and/or the pupil: and determining eye gaze of the user upon a said one or more marker as indicative of the user's eye gaze at the surface, object, or visual scene.

One application of eye gaze tracking is in small or large surfaces, particularly large displays or projected wall or semi-transparent surfaces, including but not limited to LCD screens, computer screens, SMART boards, tabletop displays, projection screens of any type, plasma displays, televisions, any computing appliance, including phones, PDAs, and the like, and head-mounted and wearable displays and the like. In addition, any surface, including, for example, walls, tables, furniture, architectural ornaments, billboards, windows, semi-transparent screens, window displays, clothing racks, commercial displays, posters, stands, any commercial or other goods, clothing, car dashboards, car windows, and the like, may be the gaze target.

By augmenting any shopping display, such as, for example, computer or television screen-based, projected, static surface, objects, goods (e.g., clothing, furniture), with eye gaze determination, eye gaze behavior of subjects (i.e., shoppers) can be tracked for the purpose of registering whether individuals are interested in the goods on display. This can be used for evaluating the design or arrangement of advertisements or arrangements of goods, or for disclosing more information about products or objects to the subject. The following scenario illustrates this application. A clothes rack is augmented with one or more eye tracking cameras, and the clothes or hangers (or any other goods). Cameras detect which item the shopper is interested in by tracking the eye gaze of the shopper. According to one option, when the duration of an eye fixation on an object reaches a threshold, a projection unit displays more information about the goods. Alternatively, in response to a fixation, the subject may be addressed using a recorded message or synthesized computer voice associated with the object of interest, which acts as an automated sales assistant. Alternatively, information about user interest in an article or advertisement may be conveyed to a sales assistant or third party.

Interactive or non-interactive home appliances can be augmented using eye tracking, to determine the availability of users for communications with other people or devices. Subjects may direct the target of speech commands to the appliance, or initiate speech dialogue or other forms of disclosure by the appliance through establishing eye gaze fixation with the appliance.

Eye tracking may be incorporated into a gaming device, portable or otherwise, may provide extra channels of interaction for determining interest in embodied gaming characters. Characters or objects in games can then observe whether they are being looked at by the user and adjust their behavior accordingly, for example by avoiding being seen or by attracting user attention. Alternatively, characters or objects can respond verbally or nonverbally to fixations by the user, engaging the user in verbal, nonverbal, textual, graphical, or other forms of discourse. In the case of speech recognition agents or online human interlocutors, the discourse can be mutual. Alternatively, the technology can be used to allow gaming applications to make use of eye gaze information for any control purpose, such as moving on-screen objects with the eyes, or altering story disclosure or screen-play elements according to the viewing behavior of the user. In addition, any of the above may be incorporated into robotic pets, board games, and toys, which may operate interactively at any level.

By incorporating eye tracking into a television display or billboard (e.g., a screen, paper, or interactive display), broadcasters and/or advertisers can determine what (aspects of) advertisements are viewed by, and hence of interest to, a subject. Advertisers may use this information to focus their message on a particular subject or perceived interest of that subject, or to determine the cost per view of the advertisement, for example, but not limited to, cost per minute of product placements in television shows. For example, this method may be used to determine the amount of visual interest in an object or an advertisement, and that amount of interest used to determine a fee for display of the object or advertisement. The visual interest of a subject looking at the object or advertisement may be determined according to the correlation of the subject's optical axis with the object over a percentage of time that the object is on display. In addition, the method may be used to change the discourse with the television, or any appliance, by channeling user commands to the device or part of the display currently observed. In particular, keyboard or remote control commands can be routed to the appropriate application, window or device by looking at that device or window, or by looking at a screen or object that represents that device or window. In addition, TV content may be altered according to viewing patterns of the user, most notably by incorporating multiple scenarios that are played out according to the viewing behavior and visual interest of the user, for example, by telling a story from the point of view of the most popular character. Alternatively, characters in paintings or other forms of visual display may begin movement or engage in dialogue when receiving fixations from a subject user. Alternatively, viewing behavior may be used to determine what aspects of programs should be recorded, or to stop, mute or pause playback of a content source such as DVD and the like.

Eye tracking technology can be used to control the location, size, transparency, shape, or motion of visible notification dialogs on large or small screens according to viewing behavior of the user. In particular, on large screens the technology allows the establishment of peripheral vision boundaries of the user's eyes, ensuring that a window is placed in view. On small screens, notification windows can be placed out of the way of the user's foveal vision, and can be acknowledged and removed after the user has viewed them. In addition, the control of any hidden or visible cursor on a display can be used to communicate attention to underlying applications or systems. In addition, activation and zooming or resizing of focus windows, and the reorganization of windows on a display, can be implemented according to the viewing behavior of the user or the movement of the user in front of the display. The latter may be accomplished by allowing users to look at the subsequent focus window, after which a key is pressed to activate this window and make it the front window. This may incorporate zooming of the front window according to an elastic tiled windowing algorithm, or fisheye view zoom of the front window. In addition, the disclosing of attention of others for notes on a public display board, by modulating aspects of size, shape or color of displayed notes, may be accomplished according to the number of times they have been viewed.

Eye tracking can be used to make the content of a display visible only to the current user, by using eye fixations to position a gaze-contingent blurring lens, directional lens, or obstruction that projects the image at the fixation point of that user but not elsewhere. This results in a screen that can only be read by the current user, and not by any other onlooker. Alternatively, the state of the screen may be altered by, for example, but not limited to, darkening, wiping, or changing its contents. Further, visual or auditory notification may be provided upon detecting more than one pair of eyes looking at the display. This is particularly useful when computing devices are used in public, for private matters. Eye tracking may also be used to modulate transparency of surfaces, for example, but not limited to, cubicle walls, upon orientation or co-orientation of the eyes, face(s), or head(s) of a subject or subjects towards that surface.

Eye tracking may also be used in advanced hearing aids to provide aiming information for directional microphones or noise cancelling microphones.

Eye tracking may be incorporated invisibly and without restrictions into vehicles to control dashboard or instrument cluster operation, to alter lighting conditions of vehicle illumination or dashboard indicators and instruments, to reduce impact on visual attention. Displays (including projections on windows) may be altered according to viewing behavior, for example, to ensure that eyes remain focused on the road, or to direct the destination of speech commands to appliances or objects within or outside the vehicle. In addition, the detection of fatigue, the operation of vehicle navigation systems, entertainment systems, visual display units including video or televisions, the selection of channels on a radio or entertainment system, and the initiation and management of remote conversations may all be carried out using the invention, according to the visual attention of the user.

Eye tracking may be used for sensing attention in remote or same-place meetings, for editing recordings of such meetings, or for the purpose of detecting presence or initiating interactions with remote or co-present attendees, or for communicating attendee attention in order to optimize a turn taking process among several remote attendees.

Eye tracking may also be used for sensing user attention towards any mobile or portable computing device to determine when a user is paying attention to the visual information provided on the device. Audiovisual media played on the device may be paused or buffered automatically upon the user looking away from the device. The device may continue playing the buffered audiovisual stream whenever the user resumes looking at the device. For example, a mobile device may provide speed reading facilities. The device streams words across a display screen in a timed manner, allowing the user to read without producing fixations. When the user looks away, the stream of words is paused, and when the user looks back at the device, the stream of words continues.

Eye contact sensing objects provide context for action, and therefore a programmable system may employ eye tracking or gaze estimation to determine context. A display may be presented, optimized to present different available contexts, from which the user may select by simply looking. When there are multiple contexts, or hybrid contexts, the user may have a complex eye motion pattern which can be used to determine complex contexts.

See, U.S. Pat. Nos. 3,689,135; 4,075,657; 4,102,564; 4,145,122; 4,303,394; 4,641,349; 4,651,145; 4,702,575; 4,755,045; 4,836,670; 4,973,149; 4,975,969; 5,008,946; 5,016,282; 5,231,674; 5,287,437; 5,325,133; 5,331,149; 5,345,281; 5,360,971; 5,428,413; 5,471,542; 5,481,622; 5,583,795; 5,638,176; 5,649,061; 5,668,622; 5,726,916; 5,797,046; 5,805,167; 5,818,954; 5,898,423; 5,912,721; 5,926,251; 5,984,475; 5,991,085; 6,120,461; 6,152,563; 6,154,559; 6,163,336; 6,204,828; 6,215,898; 6,220,706; 6,243,076; 6,246,779; 6,299,307; 6,323,884; 6,369,952; 6,381,339; 6,393,136; 6,397,137; 6,456,737; 6,477,267; 6,478,425; 6,546,121; 6,568,809; 6,578,962; 6,603,504; 6,608,615; 6,634,749; 6,659,611; 6,659,611; 6,727,866; 6,753,847; 6,843,564; 6,853,854; 6,943,754; 6,989,754; 6,999,071; 7,040,759; 7,043,056; 7,076,118; 7,084,838; 7,090,348; 7,091,931; 7,138,997; 7,161,596; 7,190,825; 7,197,165; 7,239,293; 7,306,337; 7,307,609; 7,315,324; 7,324,085; 7,331,929; 7,345,664; 7,388,580; 7,391,887; 7,396,129; 7,401,920; 7,423,540; 7,428,001; 7,448,751; 7,460,940; 7,490,941; 7,501,995; 7,503,653; 7,520,614; 7,528,823; 7,538,746; 7,542,210; 7,554,541; 7,556,377; 7,567,702; 7,572,008; 7,583,252; 7,600,873; 7,620,216; 7,626,569; 7,633,493; 7,650,034; 7,665,845; 7,693,256; 7,701,441; 7,702,660; 7,703,921; 7,705,876; 7,706,575; 7,724,251; 7,731,360; 7,742,623; 7,753,523; 7,762,665; 7,766,479; 7,768,528; 7,787,009; 7,801,686; 7,809,160; 7,810,926; 7,815,507; 7,819,525; 7,834,912; 7,839,400; 7,857,452; 7,860,382; 7,862,172; 7,866,818; 7,869,848; 7,872,635; 7,880,739; 7,916,977; 7,925,077; 7,938,540; 7,948,451; 7,963,652; 7,970,179; 7,974,787; 7,983,733; 7,986,318; 7,999,844; 8,014,571; 8,020,993; 8,065,240; 8,069,125; 8,077,217; 8,077,914; 8,099,748; 8,100,532; 8,121,356; 8,130,260; 8,150,796; 8,154,781; 8,155,479; 8,170,293; 8,175,374; 8,195,593; 8,199,186; 8,219,438; U.S. Pub. App. Nos. 20030098954; 20030123027; 20040174496; 20040239509; 20050073136; 20050175218; 20050288564; 20060028400; 20060110008; 20060227103; 20080002262; 20080287821; 20090018407; 20090024050; 20090110245; 20090112616; 20090112617; 20090112620; 20090112621; 20090118593; 20090119154; 20090132275; 20090156907; 20090156955; 20090157323; 20090157481; 20090157482; 20090157625; 20090157660; 20090157751; 20090157813; 20090163777; 20090164131; 20090164132; 20090164302; 20090164401; 20090164403; 20090164458; 20090164503; 20090164549; 20090171164; 20090172540; 20090219484; 20090318773; 20100033333; 20100039617; 20100086200; 20100086221; 20100086278; 20100149073; 20100208205; 20100280372; 20100295774; 20110007275; 20110018903; 20110170065; 20110178784; 20110182472; 20110228975; 20120026276; 20120092618; 20120105486; 20120116559; 20120120498; 20120120499; 20120133889; 20120134548; 20120154633; 20120154920; 20120164613; and Foreign Patent Nos. JP1990224637; JP1995055941; JP2003015816; JP2004504684; JP2005230049; JP2006328548; JP2007055941; JP2007073273; WO2002009025; WO2004045399; WO2008069158, each of which is expressly incorporated herein by reference.

SUMMARY OF THE INVENTION

The ability to capture the direction the eyes point in while the subject is a distance away from the camera offers the potential for intuitive human-computer interfaces, allowing for a greater interactivity, more intelligent behavior, and increased flexibility. A system is provided that detects the face from a fixed, wide-angle camera, estimates a rough location for the eye region using an eye detector based on topographic features, and directs another active pan-tilt-zoom camera to focus in on this eye region. An eye gaze estimation approach is also provided for point-of-regard (PoG) tracking on a large viewing screen. To allow for greater head pose freedom, a calibration approach is provided to find the 3D eyeball location, eyeball radius, and fovea position. Moreover, both the iris center and iris contour points are mapped to the eyeball sphere (creating a 3D iris disk) to get the optical axis; the fovea is then rotated accordingly, and the final, visual axis gaze direction computed. This gaze estimation approach may be integrated into a two-camera system, permitting natural, non-intrusive, pose-invariant point of gaze (PoG) estimation in distance, and allowing user translational freedom without resorting to infrared or complex hardware setups such as stereo-cameras or "smart rooms."

According to various embodiments of the invention, a system and method is provided that robustly locates the face from a wide-angle camera view (as well as a rough approximation of the eye positions) and uses this information to guide a pan-tilt-zoom camera to focus in on the eye area of the detected face. This allows the user translational freedom relative to the camera, and a simple adjustment of parameters also permits varied movement in depth freedom. The system differs from the majority of other systems in this vein in that we do not use infrared, stereo-cameras, specially-constructed hardware (like Noureddin et al. [10]), or specific room setups (i.e. "smart rooms"). This system and method are useful for gaze and PoG (Point-of-Regard) estimation.

To bypass the issue of the diminished accuracy of iris centers from visible light imagery while simultaneously avoiding the problems heir to the potential instability of iris contour extraction, both are leveraged to determine eye gaze direction with a 3D eyeball model. The 3D eyeball centers, radii, and fovea points are calculated through a unique calibration approach. During gaze estimation, both the estimated iris center and the iris contour points are mapped onto the eyeball sphere. After converting these points into vectors starting at the eyeball center, a least-squares approach (or other optimization scheme) may be used to find a vector that is at a known angle from the contour vectors while also being approximately in line with the center vector. The current position of the fovea is found, which is dependent on the rotation of the eye, a new iris center computed from the initial gaze vector, and the vector from the fovea to this new iris center used as the final gaze direction. This approach differs from the majority of previous techniques, in that the 2D contour pixels are mapped onto the known 3D eyeball; in contrast, most approaches in this vein project the 3D model into the 2D plane.

The aforementioned camera system is preferably integrated with the gaze and PoG (Point-of-Regard) estimation approach.

The process may comprise the following steps, in combination or sub-combination:

An image is captured, and a face detected.

Once the face is detected (or perhaps directly, without antecedent face detection), eye detection is performed, for example using the so-called topographic features of eyes. A pan-tilt-zoom camera may be directed at the approximate center of the two detected eye candidates, and the centroid tracked over a series of frames.

According to a preferred embodiment, the red channel of a color video image is analyzed, since the iris generally has very low red intensity values. The image (i.e., the red channel) is then searched for some particular feature or set of features, such as, "highlight positions" on the eye, which typically represent specular reflections off the iris. The image is analyzed to remove distracting points on glasses, by eliminating long, thin specular reflections. The histogram within the eye region is equalized to increase contrast. The position is refined using a circular template in a very small area around the initial estimate.

The user first looks into the camera center and then at a calibration point P whose 3D location is known. This gives 2D iris locations $m_1$ and $m_2$, respectively, which are then converted into normalized unit vectors A and B. Two points are sought: E (the eyeball center) along vector A; and E' (the iris center) along vector B, such that: the distance between E and E' is r (eyeball radius), and the vector between them points at P. The first calibration point is used to get the B vector. Once $t_a$ is obtained, A is scaled by this value and get a 3D eyeball center estimate for a given radius. For each eyeball estimate (and corresponding radius), the gaze estimation error across all calibration points is obtained. The estimate selected is the estimate with the smallest error. Of course, various optimization criteria can be used to select the gaze position. For example, if there are a limited number of options, the gaze position estimation may be selected based on a history, context, prediction (based on other factors) or statistics, in any combination or sub-combination thereof. Alternately, the system may provide user feedback and be adaptive based on the feedback.

The basic algorithm assumes that the eyeball center (E), the 3D iris center (E'), and the 3D gaze point (P) are all coplanar, which may not be true if the user's head moves during the calibration procedure. Thus, the vectors should be adjusted for head rotation and translation before performing the calibration calculations.

Due to the optical/visual axis offset as well as user error during calibration, a secondary, iterative refinement procedure should be performed. This procedure preferably encompasses a position/radius binary search, wherein the fovea position is calculated as intersection of original A vector with final eyeball sphere, and stored as an offset from eyeball center. The final 3D eyeball center is given as an offset from the 3D head point. The eyeballs are then translated/rotated with the head.

To get the iris contour points, the following algorithm is executed. A smaller search region around the iris position is defined, and the grayscale image blurred with a Gaussian filter. Gradient magnitudes and directions are then extracted.

Given a normalized 2D vector H that goes from the iris center estimate to the 2D eyeball center, shoot rays R, outwards around H (one ray per degree). For all pixels (within search region) along each ray, a score may be computed:

$$\text{score}_{i,j} = m_{i,j} * (dot(H, D_{i,j}) > 0.5) \quad (13)$$

where i is the ray index, j is the pixel index, $m_{i,j}$ is the gradient magnitude, and $D_{i,j}$ is the normalized gradient direction vector (from dark to light pixels).

The highest scoring pixel along each ray is chosen as a potential iris contour point. Duplicate points (caused by overlapping rays) are removed, giving N' iris contour points. To eliminate possible eyelid edges, only keep pixels with horizontal gradient angles (vertical edges); this gives us our final N iris contour points. The confidence value for contour is computed as N/N'.

The iris center and contours are detected, and converted to perspective vectors. These points are then mapped to the eyeball sphere.

The current eyeball center is subtracted and the vectors are normalized to ultimately get V (iris center) and all C, vectors (iris contours). The optical axis G is sought such that: 1) it is parallel to V, and 2) the dot product of G and each $C_i$ is aveDot.

Thus, the following linear equations are solved:

$$\begin{bmatrix} C_0^X & C_0^Y & C_0^Z \\ \cdots & \cdots & \cdots \\ C_N^X & C_N^Y & C_N^Z \\ V^X & V^Y & V^Z \\ \cdots & \cdots & \cdots \\ V^X & V^Y & V^Z \end{bmatrix} \begin{bmatrix} G^X \\ G^Y \\ G^Z \end{bmatrix} = \begin{bmatrix} aveDot \\ \cdots \\ aveDot \\ 1 \\ \cdots \\ 1 \end{bmatrix} \quad (13)$$

Parameter aveDot is found by getting the average dot product of all C, vectors from the "look-into-camera" phase of calibration and an approximation of the optical axis (use intersection of iris center perspective ray with the eyeball)

To get the visual axis, the fovea offset is rotated based on the optical axis G. The optical axis is intersected with the eyeball sphere to get a new estimate for the 3D iris center, and take the normalized vector from the fovea to this new iris center as our final gaze direction. In order to perform screen mapping, the screen's 3D position, size, and orientation relative to the camera are determined or assumed to be known. Given a gaze starting point and vector, mapping is a simple ray-plane intersection process. The average position of the two eyeball centers is used as the starting point and the average of the two visual axis vectors as the gaze direction.

A two (multiple)-camera system may be provided that can detect the face and eyes and allows for translational movement freedom, without resorting to infrared light, stereo-camera setups, or other complex hardware solutions. Moreover, an eyeball center and fovea offset extraction procedure and gaze estimation approach may be employed, both of which are fully capable of dealing with head pose adjustments.

The screen may be located relative to the camera, and uses points on the screen itself for calibration. These points are adjusted for the rotation of the active camera during calibration.

The system obtain information about a subject's visual interest in an object or visual scene. For example, the subject may be a shopper and the visual scene may comprise items on display. The method may further comprise determining duration of point of gaze on an item; and disclosing information about the item when the duration of point of gaze exceeds a threshold duration. Information may be obtained about the visual interest of subjects for an object on display, such as a product or advertisement, and the information used to determine the cost of displaying that object or advertisement. The method may comprise determining whether the location of the point of gaze is on the item, and disclosing information about the item to the subject when the location of the gaze is or has been on the item; determining duration of point of gaze on an item, wherein disclosing depends on length of such duration; disclosing information about location and/or duration of point of gaze on an item to a third party; and/or using said information to determine a cost of displaying said item. Moving objects may be tracked by the subject's eye. The point of gaze of a user on an object may be identified, as a control signal to a mechanical device that moves the object. The object may, for example, move according to the user's gaze, or portions of the object, e.g., a robot, move based on the user's attention. The user control may be based on the point of gaze, time of gaze, gaze movement, dynamic gaze endpoints, dynamic gaze parameters (speed, acceleration, direction, etc.), etc. Further, the gaze of multiple concurrent users may be tracked, with control of one or more object or portions of objects in response to the multiple concurrent users. Gaze may be used to control a device or appliance, or to control a flow of information, or a relationship, between multiple devices. For example, the target device of a "universal" remote control may be determined based on a user's gaze direction.

Gaze may also be used to control a visual user interface, with a two or three dimensional space cursor following the gaze direction. Different gestures, e.g., hand, face or head, eye or eyelid, voice, may be used to control actions, depth ambiguity, and/or provide other spatial or non-spatial control inputs. The gestures may be received using the same optical system as the gaze, or through a different system. For example, a Microsoft Kinect or similar scene or motion capture device may be used to acquire physical gestures and audio inputs, which may be processed along with the eye gaze information. In a graphic user interface embodiment, the point of gaze or one or more users of a graphical user interface may be determined, and the appearance of information on the graphical user interface controlled in accordance therewith. In a hand-held communication device embodiment, one or more cameras facing the user may acquire gaze information, to perform user interface functions such as dialing, typing, smart-phone graphic user interface input, etc. Actions may be indicated special blinks or blink sequences, long duration stare, or non-eye gesture or input, such as manual or facial gesture, voice or audio, or the like.

According to the invention, a computer may be programmed to execute the method steps described herein. The invention may also be embodied as device or machine component that is used by a digital processing apparatus to execute the method steps described herein. The invention may be realized in a critical machine component that causes a digital processing apparatus to perform the steps herein. Further, the invention may be embodied by a computer program that is executed by a processor within a computer as a series of executable instructions. The instructions may reside in random access memory of a computer, or on a hard drive, optical drive of a computer, flash memory, or the like.

DETAILED DESCRIPTION OF THE PREFERRED EMBODIMENTS

Figure 1:
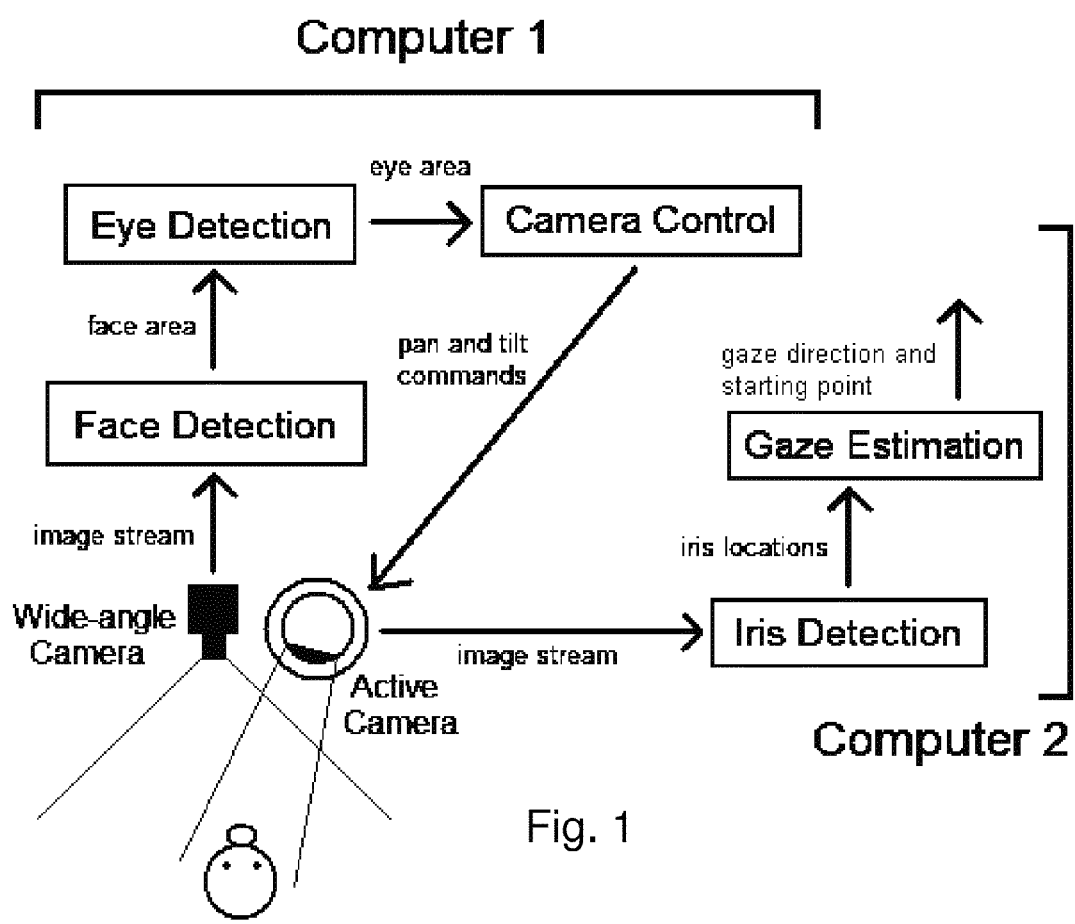
FIG. 1 depicts a system according to the present invention.
Figure 2:
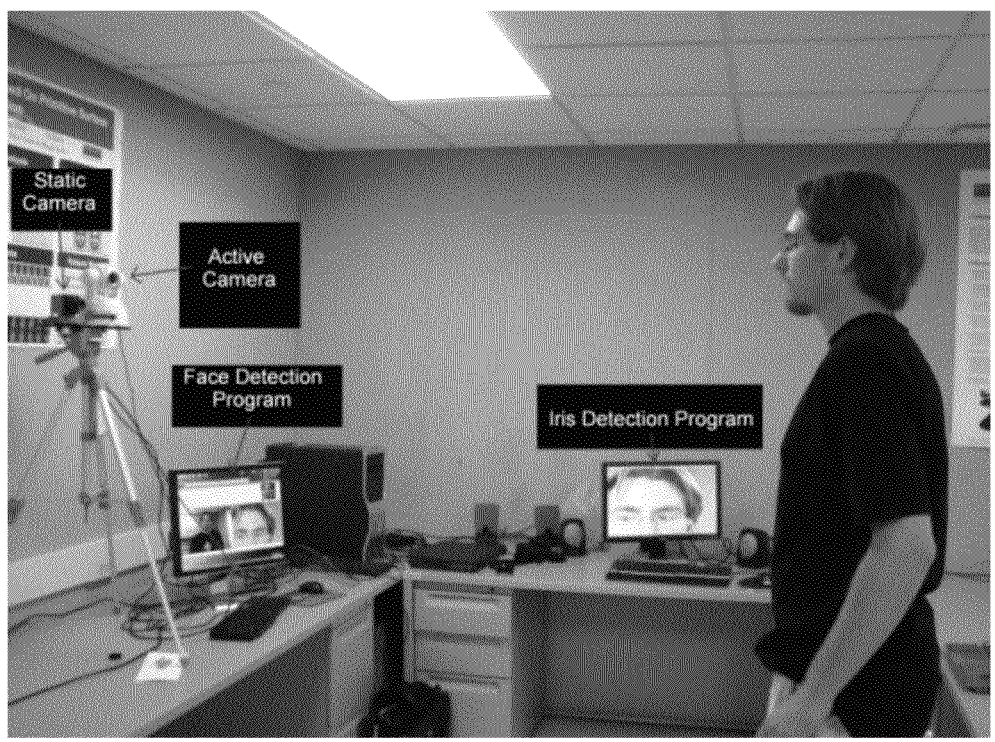
FIG. 2 shows the system of FIG. 1 in use.

The complete system consists of five different stages: face detection, eye area detection (wide-angle view), camera control, iris detection (narrow-angle view), and gaze calibration/estimation (narrow-angle view). The first three are part of one program, while the last two are part of another; these two programs run on separate computers. According to one embodiment, an IEEE 1394 camera is used for the wide-angle view; images from this camera are used for face detection. Once a face and eye area center are detected, the detection program controls a SONY SNC-RZ30N camera, which can pan ±170° and tilt from −90° to +25°. It also has a 25× optical zoom. This camera gives us a close-up view of the face (640×480 images at approximately 15 to 30 fps), which can then be used by the eye detection program. FIG. 1 depicts the system composition, while FIG. 2 depicts the system in action. In the integrated system, the gaze estimation uses the active camera view, and the iris centers and contours are extracted from the active camera image stream. Then, after gaze calibration, the gaze direction and starting point (i.e. eyeball centers) is estimated and then mapped to screen coordinates.

Face Detection

An appearance-based technique is employed, based on the work by Viola and Jones [14] for face detection. To improve the robustness of the face detector, a linear-time mechanism is used to make the system invariant to variable lighting conditions: all features are scaled by a ratio of the average gray-level intensity of the training samples over the average gray-level intensity of the current search region. The integral image is used to efficiently compute feature block intensity levels. The best Haar-like features are selected with Adaboost; we then used Information Gain in the Gain Ratio as a metric of usefulness. The details of the developed face detector can be found in [7].

Eye Detection (from the Static Camera View)

Once the face is detected, eye detection is performed using the so-called topographic features of eyes [15]. The basic idea is to create a terrain map from the gray-scale image (effectively treating it like a continuous 3D surface) and extracting "pit" locations as pupil candidates. The actual eye pair is chosen using a Gaussian Mixture Model (GMM) and certain heuristics (e.g. the eye candidates cannot be vertical). The approximate center of the two detected eye candidates is used as the focus of the pan-tilt-zoom camera. Note the mutual information tracking approach presented in [15] is not used, and instead the eyes detected once every time the face is detected in the wide-angle view.

Iris Detection (from the Active Camera View)

The above stage provides an approximate localization of eyes, allowing the active camera to zoom into the region of interest. To detect the accurate positions of irises, we propose a fine detection approach as follows.

The red channel of the image is preferably employed, since the iris (unlike the surrounding skin areas) generally has very low red intensity values [13]. "Highlight positions" on the eye (corresponding to specular reflections off the iris) are searched; these are regions containing enough dark pixels to be considered part of the iris while still having a high enough standard deviation to contain specular reflection points. To remove distracting points on glasses, specular reflections that are long and thin (unlike iris highlights, which are generally equal in width and height) are eliminated. Unlike Vezhnevets and Degtiareva [13], the histogram is equalized within the eye region to increase contrast. To determine the proper thresholds and parameters, information from 7 video sequences collected using the active camera are analyzed. Finally, the initial iris estimate is refined using a circular template in a very small area around the initial estimate.

Gaze Calibration (from the Active Camera View)

The calibration procedure has two stages: the first acquires an estimate for the 3D eyeball center and radius, and the second iteratively refines our initial estimate while also extracting the position of the fovea on the eyeball surface. Note that each eyeball is handled independently during calibration.

Stage 1 Calibration (Initial Estimate)

At this point, the 2D iris positions are obtained, and the camera's focal length assumed as known; given a 3D eyeball radius r, an estimate for the 3D eyeball center E is sought.

The camera center is considered the origin of a 3D coordinate system and the camera view direction as the z axis. Given a 2D pixel position and the camera's focal length, a 3D vector can be obtained from the camera center through every 3D position that maps to our given 2D pixel point. This can be done simply by constructing a "world image plane," a 3D plane which is perpendicular to the camera's view axis and is far away enough such that 3D points in the plane have the same x and y coordinates as their projected 2D points. A 2D pixel point can then be converted to a 3D vector by setting its z coordinate to be the z depth of the world image plane.

If the user is looking straight into the camera, it is assumed that the eyeball center must be somewhere along a 3D vector starting at the camera center and going through the 2D iris center; that is, the gaze direction goes from the 3D eyeball center E to the 3D iris center E' (this vector is known as the "optical axis"). Granted, this is not strictly true, since the correct gaze direction (called the "visual axis") is a vector from the fovea (on the back of the eye) through the pupil [5], and this visual axis is offset from the optical axis by approximately 4-8° [4]. However, this will be corrected for in Stage 2.

Figure 3:
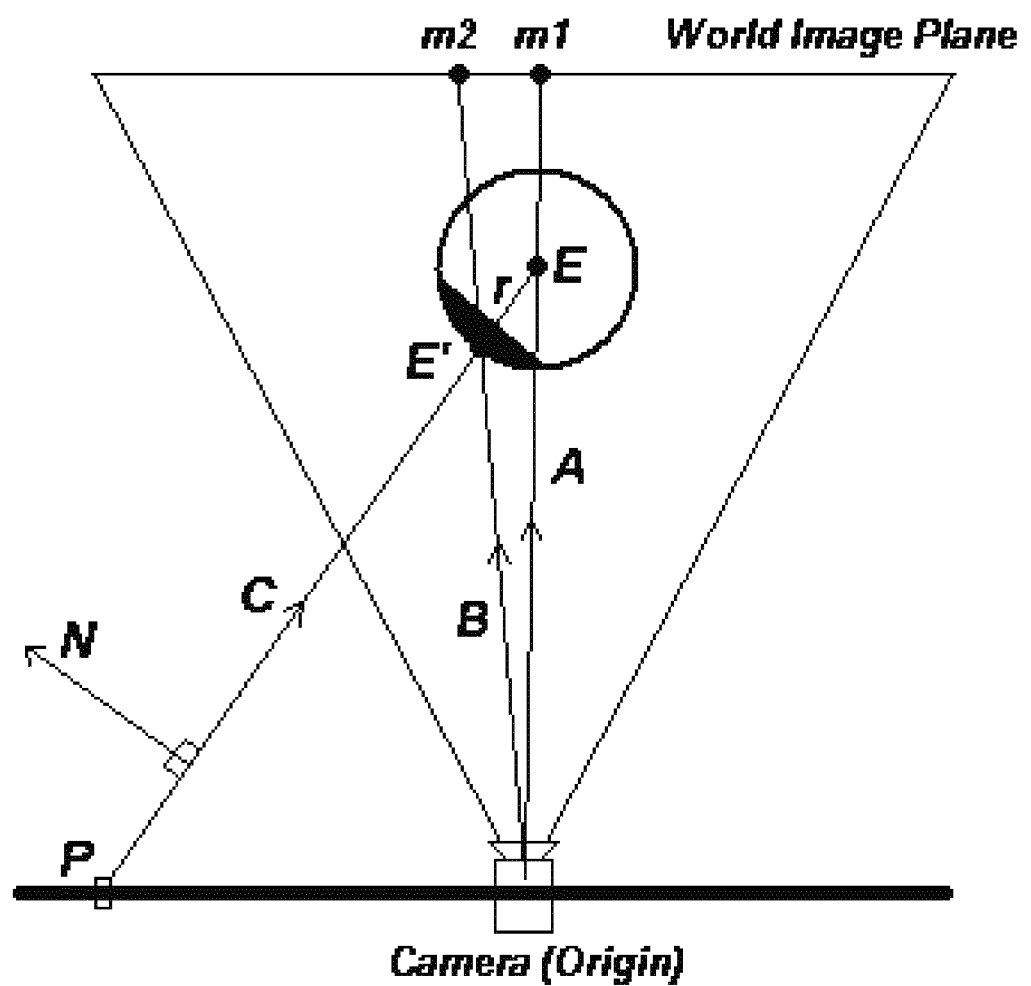
FIG. 3 shows stage 1 of a calibration procedure.

The user first looks into the camera and then at a calibration point P whose 3D location is known. This gives the 2D iris locations m1 and m2, respectively. These points are then converted into normalized vectors A and B. Two points are sought, E (the eyeball center) along vector A and E' (the iris center) along vector B, such that the distance between them is r (the radius of the eyeball) and the vector between them points at P. FIG. 3 illustrates this idea.

Let $t_a$ and $t_b$ represent the lengths such that $At_a=E$ and $Bt_b=E'$; the first constraint may be expressed as follows:

$$\|At_a - Bt_b\| = r \quad (1)$$

Point E' (or $Bt_b$) is the point of intersection between $C=At_a-P$ and B. This is equivalent to the point of intersection between B and a plane determined by point P and normal $N=(A \times B \times C)$. So, the second constraint is as follows:

$$t_b = \frac{N \cdot P}{N \cdot B} \quad (2)$$

Given above equations (1) and (2) with two unknowns $t_a$ and $t_b$, the following quartic formula is derived, and solved for $t_a$:

$$St_a^4 + Tt_a^3 + Ut_a^2 + Vt_a + W = 0 \quad (3)$$

$$S = Y^2 \quad (4)$$

$$T = -2TZ - 2(A*B)XY \quad (5)$$

$$U = Z^2 + 2(A*B)XY - r^2y^2 + x^2 \quad (6)$$

$$V = 2r^2 YZ \quad (7)$$

$$W = -r^2 Z^2 \quad (8)$$

$$X = (A \times B \times A) * P \quad (9)$$

$$Y = (A \times B \times A) * B \quad (10)$$

$$Z = (A \times B \times P) * B \quad (11)$$

Once $t_a$ is obtained, A can be scaled by this value and a 3D eyeball center estimate obtained for a given radius. Although a standard eyeball radius might be employed, instead a range of 1.1 cm to 1.4 cm is cycled in ⅒th millimeter increments, and an eyeball estimate obtained for each radius size. This corresponds approximately to the natural range of eyeball radius sizes found in humans (1.2 cm to 1.3 cm) [5].

During the calibration procedure, the user looks into the camera first, and then at four calibration points. The first calibration point is used to get the B vector. For each eyeball estimate (and corresponding radius) and each of the four calibration points, the gaze estimation approach used to determine the estimated point of regard and get its distance from the true gaze (calibration) point. These error distances are added together, and the eyeball estimate (and radius) with the smallest error is chosen.

Note that this approach assumes that eyeball center (E), 3D iris center (E'), and 3D gaze point (P) are all coplanar, which may not be true if the user's head moves during the calibration procedure; thus, the vectors adjusted for head rotation and translation before performing the calibration calculations.

Stage 2 Calibration (Refinement and Fovea Location)

Due to the optical/visual axis offset (as well as user error during calibration), the initial estimates can be off slightly from their true position. Therefore, a secondary, iterative refinement procedure employed that uses a binary search to find the best eyeball center within ±5 cm of our initial estimate (to a precision of ¹⁄₁₀₀th of a millimeter). The radius search is refined simultaneously, using the same range as before, but also with ¹⁄₁₀₀th millimeter precision.

Finally, another binary search is performed, this time moving the eyeball position up and down (within 2.5 mm of the current estimate). The fovea is assumed to lie along the A vector, and its position obtained by intersecting A with the sphere centered at the final eyeball center estimate.

The 3D eyeball center is thus obtained (which can be rotated and translated with head position and pose information), the 3D eyeball radius, and the fovea point (stored as an offset from the eyeball center). 5 sample frames are used for each calibration point, including the look-into-camera stage.

Gaze Estimation (from the Active Camera View)

For a given frame, the eyeball center position adjusted based on the current head pose and position. Using the 2D iris center, the iris contour points are sought and mapped to (and the iris center) the eyeball sphere, the optical axis determined, the fovea point rotated accordingly (since its location is dependent on eye position and rotation only), the new (3D) iris center computed from the optical axis, and finally the visual axis obtained as the vector from the fovea to the new iris center.

To obtain the iris contour points, the following eight steps are performed: (1) Define a smaller search region around the iris position and blur the grayscale image with a 5×5 Gaussian filter; (2) Extract gradient magnitudes and directions; (3) Given a normalized 2D vector H that goes from the iris center estimate to the 2D eyeball center, shoot rays $R_i$ outwards ±125° around H (one ray per degree); (4) For all pixels (within search region) along each ray, compute $score_{i,j}=m_{i,j}*(dot(H>0.5)$, where i is the ray index, j is the pixel index, $m_{i,j}$ is the gradient magnitude, and $D_{i,j}$ is the normalized gradient direction vector from dark to light pixels; (5) The highest scoring pixel along each ray is chosen as a potential iris contour point, similar to [8]; (6) Remove duplicate points (caused by overlapping rays), giving N' iris contour points; (7) To eliminate possible eyelid edges, only keep pixels with gradient angles between [−35°, 35°], [145°, 180], and [445°, −180°] (vertical edges only); this gives the final N iris contour points; (8) Compute confidence value for contour as N/N'.)

Figure 4:
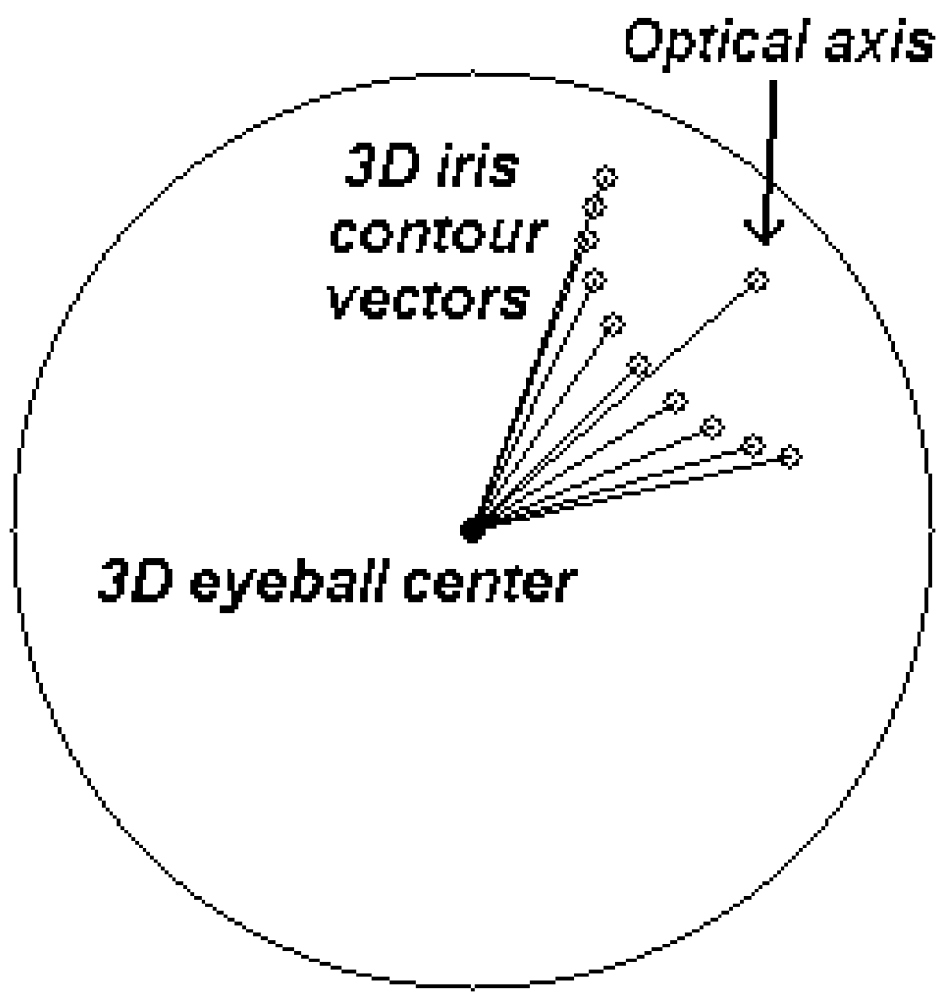
FIG. 4 shows "iris disk" concept: shorter vectors are the "iris contour vectors," while the longer vector is the computed (optical axis) gaze direction.

The 2D iris contour points are mapped to the eyeball sphere by converting them into 3D perspective vectors and intersecting them with the current eyeball sphere. A normalized vector going from the eyeball center to one of those intersection points is referred to as an "iris contour vector" $C_i$. Before performing gaze estimation, the 3D iris radius on the eyeball is estimated (or rather, the average dot product between the optical axis and each $C_i$). The information extracted during the look-into-camera phase of the calibration procedure is used; note that an approximation of the optical gaze vector can be extracted by intersecting the 2D iris center with the eyeball sphere, subtracting the eyeball center, and normalizing the result, giving us vector V. The average of the dot products (aveDot) between V and each $C_i$ are obtained. In this way, the "iris disk" is defined. See FIG. 4 for an illustration of this concept. This unique approach of mapping 2D contour points directly onto the 3D eyeball sphere allows for efficient detection of the gaze direction. This process is discussed in more detail below.

Given a normalized 2D vector H that goes from the iris center estimate to the 2D eyeball center, shoot rays R, outwards around H (one ray per degree). For all pixels (within search region) along each ray, a score may be computed:

$$score_{i,j}=m_{i,j}*(dot(H,D_{i,j})>0.5) \quad (12)$$

where i is the ray index,
j is the pixel index,
$m_{i,j}$ is the gradient magnitude, and
$D_{i,j}$ is the normalized gradient direction vector (from dark to light pixels).

The highest scoring pixel along each ray may be chosen as a potential iris contour point. Duplicate points (caused by overlapping rays) are removed, giving N' iris contour points. To eliminate possible eyelid edges, only pixels with gradient angles are kept, providing the final N iris contour points. The confidence value for contour is computed as N/N'.

The iris center and contours are detected, and converted to perspective vectors. These points are mapped to the eyeball sphere.

For gaze estimation, the iris center and contours are detected, and these points mapped to the eyeball sphere to ultimately get V (iris center) and all $C_i$ vectors (iris contours), respectively. The optical axis G is sought, such that 1) it is parallel to V and 2) the dot product of G and each $C_i$ is aveDot. Thus, we solve the following linear equations:

$$\begin{bmatrix} C_0^X & C_0^Y & C_0^Z \\ \ldots & \ldots & \ldots \\ C_N^X & C_N^Y & C_N^Z \\ V^X & V^Y & V^Z \\ \ldots & \ldots & \ldots \\ V^X & V^Y & V^Z \end{bmatrix} \begin{bmatrix} G^X \\ G^Y \\ G^Z \end{bmatrix} = \begin{bmatrix} aveDot \\ \ldots \\ aveDot \\ 1 \\ \ldots \\ 1 \end{bmatrix} \quad (13)$$

Note that aveDot, V, and the constant 1 are repeated in their respective matrices N times (once for each contour vector).

To get the visual axis, the fovea offset is rotated based on the optical axis G. The optical axis is intersected with the eyeball sphere to get a new estimate for the 3D iris center, and the normalized vector taken from the fovea to this new iris center as the final gaze direction.

It is preferable to average the eyeball centers and the gaze directions over several frames to get stable estimates (our current buffer is for the eyeball is 10 frames, while 3 frames are used for the gaze direction). Moreover, the gaze direction is weighed by the confidence value from the contour extraction.

Once the current 3D eyeball position and gaze vector are obtained, this information is mapped to screen coordinates. It is assumed that the screen's 3D position, size, and orientation are already known, and so the mapping is a simple ray-plane intersection. The average position of the two eyeball centers is used as the starting point and the average of the two visual axis vectors as the gaze direction.

For all stages of calibration and gaze estimation, a given sample of data is not used unless its confidence value exceeds 10% (which is rather low but does at least get rid of utterly erroneous values). Moreover, while the calibration and gaze values are computed for each eye separately, a sample is not used unless both eyes have high enough confidence values.

A gaze and point of gaze estimation experiment is performed wherein the user was asked to look at 20 gaze markers on the screen (effectively, the center of each brick in a 5×4 grid). To ensure that the calibration points were at known locations relative to the camera, a Logitech Orbit AF web camera was used in a special rig, with a yardstick attached for the purpose of evaluating the calibration and gaze estimation approaches. A close-view face image captured from a distance by an active camera (using an optical zoom) is approximately equivalent to the face image captured by a static camera close the subject, and the effect of a zoom lens simulated by positioning the user's head about 30 to 40 cm away from the camera. Camera images were 640×480 pixels. Head pose information was extracted using an existing face library [6]. Each marker was gazed at for 2-4 seconds (about 20 gaze samples for each marker on average).

Figure 5:
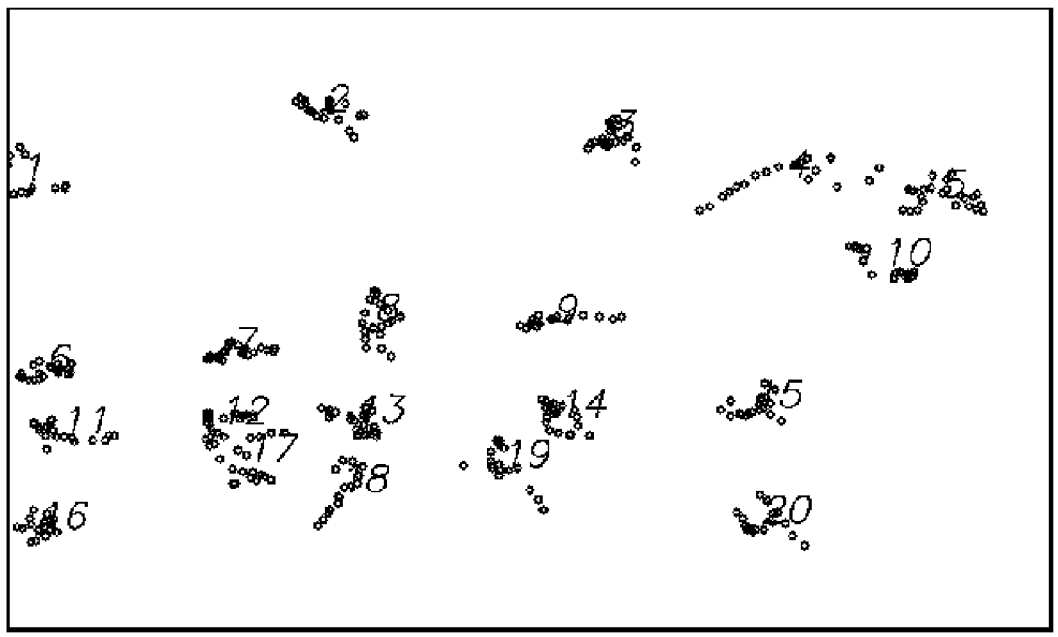
FIG. 5 shows a properly scaled gaze test, captured with a web camera, in which the numbers represent each cluster when the user looks at the center of blocks in positions from left to right, row by row from top to bottom.
Figure 6:
FIG. 6 shows a gaze test captured with a web camera, in which the large white lines are the gaze directions (visual axis)
Figure 7:
FIG. 7 shows a gaze direction test with active camera images.

FIG. 5 shows the estimated gaze positions, while Table 1 lists the variability of the gaze direction for a given gaze point ("intra-cluster"), and the separation (again, in gaze direction angles) between clusters ("inter-cluster"). The latter is computed as the mean angular distance between the average gaze directions of neighbor clusters horizontal and vertically. Finally, FIG. 6 shows some samples of the gaze estimation results with the user's head rotated.

The ordering of the gaze points matches the pattern of the grid, and the clusters themselves are fairly compact. We believe that a further corrected calibration between the camera and the screen could improve the result.

TABLE 1

Intra- and inter-cluster separation (in degrees)

|  | Min | Max | Mean | Std Dev |
| --- | --- | --- | --- | --- |
| Intra-cluster | 0.0684° | 4.9158° | 1.0889° | 0.6710° |
| Inter-cluster | 2.3292° | 16.4482° | 8.0991° | 4.7793° |

The present system has following major advantages. It uses a regular visible optical camera with diffuse illumination, and it does not require structured illumination, infrared images, or other specialized hardware. It provides 3D eye ball gaze axis estimation, and it is 3D head pose invariant. The system provides a feasible method for gaze tracking in a distance from the cameras. The system compensates for slight inaccuracies in iris center and contour points by using both in an LSQ approach.

The calibration approach of the present method proceeds by determining the 3D eyeball center, radius, and fovea position. The gaze is then estimated by creating a 3D "iris disk" out of iris contour points and iris center, deriving the optical axis, and rotating the fovea to get the visual axis. In a computer user interface system, the visual axis may then be mapped to a display screen, or otherwise used as part of a user input paradigm.

The present system and method maps a set of 2D points to a 3D eyeball, deriving the optical axis directly, and is therefore efficient. The system provides gaze estimation in a manner which is head pose invariant.

The present gaze estimation technology may be used for passive monitoring of persons, to determine interest, distraction, or focus, for example. The technology may be applied to individuals or to groups. Likewise, the technology provides an additional possibility for user input to a visual user interface, especially where the input sought is stream of use focus rather than a discrete object.

The technology thus may be used in interactive advertising or other information optimization schemes, where the user attention focus over time provides useful information, and suitably permits user control either explicitly or implicitly.

Another aspect of the technology is that it provides an additional degree of freedom for a user to control a system, especially where the hands are unavailable or already and/or independently employed.

Because the gaze direction of one or more users is available and employed, the technology is particular useful in environments where the user is expected to focus his or her eyes on a particular object, and therefore by monitoring the user's gaze direction, the location of the object of the user's attention can be inferred. Thus, where a user is interacting with a television or media display, the user's gaze may be used to provide a control input, to supplement or replace a "remote control". The gaze direction may also be used to trigger a retrieval and/or display of additional information. For example, a browser hyperlink may be exercised by a significant user attention on the hyperlink trigger. In other cases, a user help screen or popup balloon may be generated in dependence on a user's gaze.

The gaze direction may also be used in place of manipulative interfaces. For example, a smart phone may be provided which receives user selections, such as dialing commands, based on a user's visual focus on a number region on the display, as determined by a rear-facing camera on the phone.

The system may be adaptive in operation. For example, where there is low ambiguity in the gaze direction, e.g., the user has only a few well-spaced discrete object to focus on, the system may select the nearest object to the estimated gaze position, and then provide calibration to the algorithm then presuming that the low ambiguity location is the exact location of gaze. Thus, during usage, the system may be tuned. On the other hand, where a historical analysis indicates a normal margin for error, and the estimated gaze direction is consistent with the object location within the margin for error, the adaptive update may be prevented, or applied with a low weighing, to avoid overcorrection for possibly noisy feedback data.

The system may be predictive, for example using a Kalman filter to predict endpoint in a dynamic gaze change. On the other hand, certain gaze direction shifts may be ignored for short periods, consistent with normal human gaze behaviors. For example, a human may sometimes look away from a focal object during thought or interruption. However, in some cases, it is preferred that the cursor remain at the earlier location during the interruption or hiatus. In cases where a user's attention is split between multiple tasks, it may be preferable to define multiple cursors, which may be concurrently active or semi-active, and retain the last state prior to a switch of focus.

The gaze direction may be used in conjunction with other user inputs, such as speech, manual input, pointing device input, hand gestures, hand pointing, body gestures, facial expressions or gesticulations, or the like.

Hardware Overview

According to a preferred embodiment, the gaze direction determination system executes on a Microsoft Windows® system, using Windows XP, Vista or Windows 7 (64-bit), having an Intel Core-2 Duo (2.0 GHz) equivalent or greater CPU, greater than 2 GB RAM, an NVIDIA graphics card supporting CUDA 3.1.9 or greater, at least 300 MB free hard disk, and a USB webcam.

Figure 8:
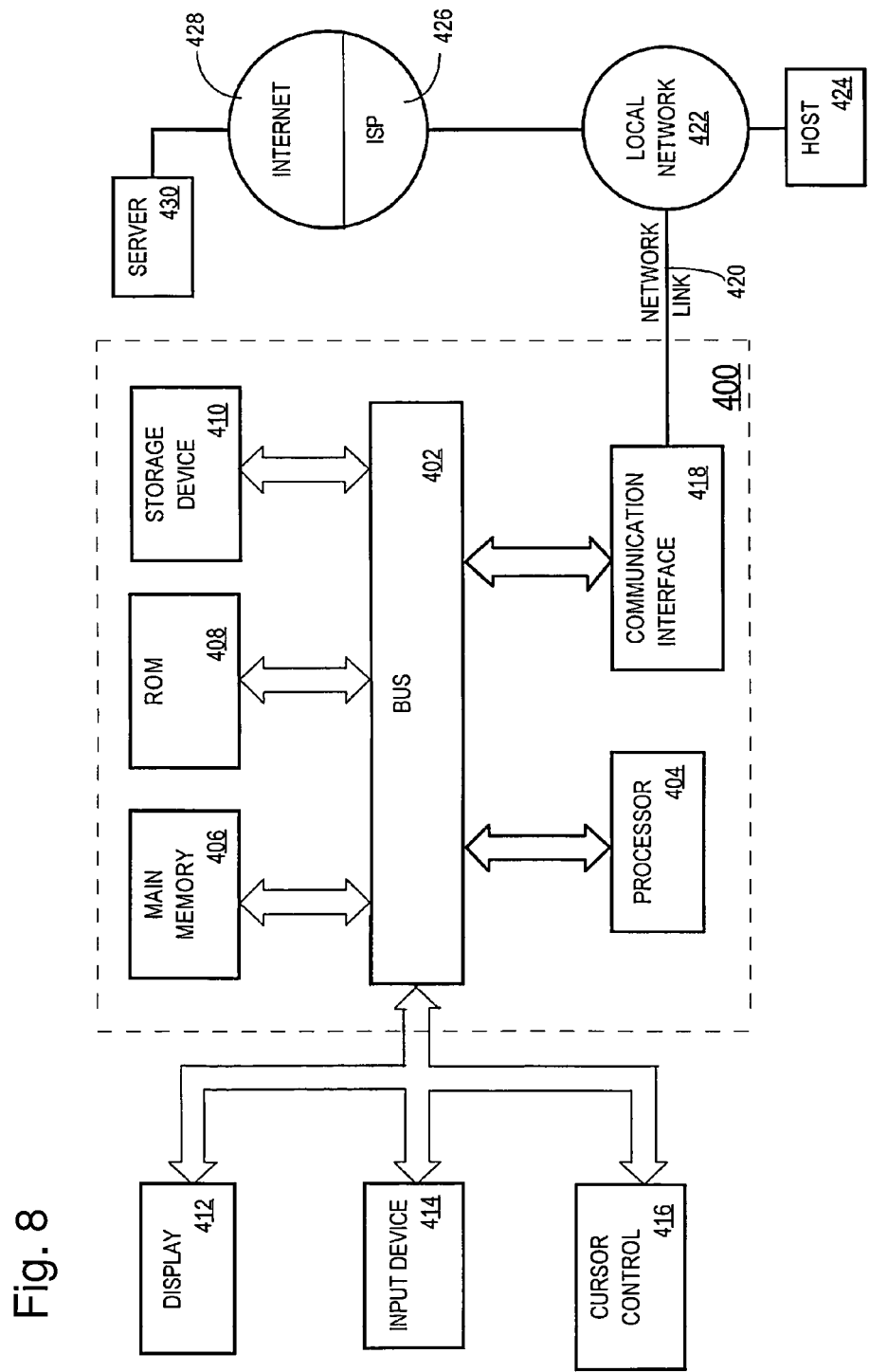
FIG. 8 shows a typical prior art hardware configuration of a networked computer system.

FIG. 8 (see U.S. Pat. No. 7,702,660, expressly incorporated herein by reference), shows a block diagram that illustrates a generic computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

The computer system may also employ non-volatile memory, such as FRAM and/or MRAM.

The computer system may include a graphics processing unit (GPU), which, for example, provides a parallel processing system which is architected, for example, as a single instruction-multiple data (SIMD) processor. Such a GPU may be used to efficiently compute transforms and other readily parallelized and processed according to mainly consecutive unbranched instruction codes.

Computer system 400 may be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

As discussed above, the present invention provides an alternate or supplemental user input system and method, which may advantageously be used in conjunction with other user interface functions which employ the same camera or cameras.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, semiconductor devices, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine. Wireless or wired communications, using digitally modulated electromagnetic waves are preferred.

Common forms of machine-readable media include, for example, hard disk (or other magnetic medium), CD-ROM, DVD-ROM (or other optical or magnetoptical medium), semiconductor memory such as RAM, PROM, EPROM, FLASH-EPROM, any other memory chip or cartridge, a carrier wave as described hereinafter, or any other medium from which a computer can read. Various forms of machine-readable media may be involved in carrying one or more sequences of one or more instructions to processor 404 for execution.

For example, the instructions may initially be carried on a magnetic disk of a remote computer. The remote computer can load the instructions into its dynamic memory and send the instructions over the Internet through an automated computer communication network. An interface local to computer system 400, such as an Internet router, can receive the data and communicate using a wireless Ethernet protocol (e.g., IEEE-802.11n) to a compatible receiver, and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

U.S. 2012/0173732, expressly incorporated herein by reference, discloses various embodiments of computer systems, the elements of which may be combined or subcombined according to the various permutations.

In this description, several preferred embodiments were discussed. It is understood that this broad invention is not limited to the embodiments discussed herein, but rather is composed of the various combinations, subcombinations and permutations thereof of the elements disclosed herein. The invention is limited only by the following claims.

REFERENCES

Each of which is Expressly Incorporated Herein by Reference

[1] K. Bernardin, H. K. Ekenel, and R. Stiefelhagen, "Multimodal identity tracking in a smart room", Personal and Ubiquitous Computing, vol. 13, pp. 25-31, 2009.
[2] D. Beymer and M. Flickner, "Eye gaze tracking using an active stereo head," CVPR '03, vol. 2, pp. 451-458, 2003.
[3] C. Colombo, D. Comanducci, and A. Del Bimbo, "Robust tracking and remapping of eye appearance with passive computer vision," ACM TOMCCAP, 3:1-20, December 2007.
[4] F. L. Coutinho and C. H. Morimoto, "Free head motion eye gaze tracking using a single camera and multiple light sources," SIBGRAPHI '06, pp. 171-178, October 2006.
[5] D. Hansen and Q. Ji, "In the eye of the beholder: a survey of models for eyes and gaze," IEEE Trans. PAMI, vol. 99, 2009.
[6] http://www.seeingmachines.com/product/faceapi/[7]
[7] Terry K. F. Hung, "Real-time face detection and applications," Master's Thesis, Binghamton University, 2008.
[8] D. Li, D. Winfield, et al, "Starburst: a hybrid algorithm for video-based eye tracking combining feature-based and model-based approaches," IEEE CVPR Workshop on V4HCI, 2005.
[9] K. Nguyen, et al., "Differences in the infrared bright pupil response of human eyes," ACM ETRA '02, 133-138, 2002.
[10] B. Noureddin, P. Lawrence, and C. Man, "A non-contact device for tracking gaze in a human computer interface," CVIU, vol. 98, pp. 52-82, 2005.
[11] T. Ohno and N. Mukawa, "A free-head, simple calibration, gaze tracking system that enables gaze-based interaction," ACM ETRA '04, pp. 115-122, 2004.
[12] E. Pogalin, A. Redert, I. Patras, and E. A. Hendriks, "Gaze tracking by using factorized likelihoods particle filtering and stereo vision," 3DPVT'06, pp. 57-64, June 2006.
[13] V. Vezhnevets and A. Degtiareva, "Robust and accurate eye contour extraction," GraphiCon, pp. 81-84, 2003.
[14] P. Viola and M. Jones, "Rapid object detection using a boosted cascade of simple features," IEEE CVPR, 2001.
[15] J. Wang, L. Yin, and J. Moore, "Using geometric property of topographic manifold to detect and track eyes for human computer interaction", ACM TOMCCAP, 3(4):1-19, 2007.
[16] J. G. Wang and E. Sung, "Gaze determination via images of irises," *Image and Vision Computing*, 19:891-911, 2001.
[17] H. Y. Wu et al., "Tracking iris contour with a 3D eye-model for gaze estimation," ACCV '07, p688-697, 2007.
[18] D. Xia and Z. Ruan, "IR image based eye gaze estimation," ACIS-SNPD '07, vol. 1, pp. 220-224, 2007.
[19] J. Xie and X. Lin, "Gaze direction estimation based on natural head movements," IEEE ICIG '07, pp. 672-677, August 2007.
[20] H. Yamazoe et al., "Remote and head-motion-free gaze tracking for real environments with automated head-eye model calibrations," CVPR Workshop on CVPR4HB, 2008.
[21] Z. Zeng, M. Pantic, G. Roisman, and T. Huang, "A survey of affect recognition methods: audio, visual, and spontaneous expressions," *IEEE Trans. on PAMI*, 31(1): 39-58, 2009.
[22] S. Zhai, C. Morimoto, and S. Ihde, "Manual and gaze input cascaded (MAGIC) pointing," ACM SIGCHI '99, p246-253 (1999).
[23] Zhai, Shuman, "What's in the eyes for attentive input", Communications of the ACM, cacm.acm.org, March 2003.
[24] Smith et al., "Hand Eye Coordination Patterns in Target Selection", IBM Almaden Research Center (2000).
[25] Atienza et al., "Active Gaze Tracking for Human-Robot Interaction", Research School of Information Sciences, The Australian National University (2002).
[26] Yang et al., "Real-time Face and Facial Feature Tracking and Applications", Interactive Systems Laboratory (1998).
[27] Sibert et al., "The Reading Assistant: Eye Gaze Triggered Auditory Prompting for Reading Remediation", Department of Computer Science and Physiology and Experimental Medicine, The George Washington University (2000).
[28] Ji et al., "Non-intrusive Eye and Gaze Tracking for Natural Human Computer Interaction", Department of Electrical, Computer, and Systems Engineering, Rensselaer Polytechnic Institute, March 2003.
[29] Wang et al., "Chinese Input with Keyboard and Eye-Tracking—An Anatomical Study", IBM China Research Lab and IBM Almaden Research Center, CHI (2001).
[30] Poole et al., "Eye Tracking in Human-Computer Interaction and Usability Research: Current Status and Future Prospects", Psychology Department, Lancaster University, UK (2007).
[31] Milekic, M. D., Ph.D., Slavko, "The More You Look the More You Get: Intention-based Interface using Gaze-tracking", Museums & Web '03: Selected Papers (2003).
[32] Beymer et al., "WebGazeAnalyzer: A System for Capturing and Analyzing Web Reading Behavior Using Eye Gaze", IBM Almaden Research Center, submitted to CHI (2005).
[33] Zhu et al., "Eye Gaze Tracking Under Natural Head Movements", Proceedings of the 2005 IEEE Computer Society Conference on Computer Vision and Pattern Recognition (CPVR '05) 1063-6919, 2005.

[33] Stiefelhagen et al., "Tracking Eyes and Monitoring Eye Gaze", Interactive Systems Laboratory, University of Karlsruhe, Germany (1997).

[34] Coutinho et al., "Free head motion eye gaze tracking using a single camera and multiple light sources", Department of Computer Sciences, Institute of Mathematics and Statistics-IME-USP (2006).

[35] Wallhoff et al., "Multimodal Face Detection, Head Orientation and Eye Gaze Tracking", Institute for Human-Machine Communication, Proceedings of MFI, Heidelberg, IEEE (2006).

[36] Roy et al., "Brain Stem Pursuit Pathways: Dissociating Visual, Vestibular, and Proprioceptive Inputs During Combines Eye-Head Gaze Tracking", Journal of Neurophysiology, Vol. 90, pp. 271-290 (2003).

[37] Matsumoto et al., "An Algorithm for Real-time Stereo Vision Implementation of Head Pose and Gaze Direction Measurement", Nara Institute of Science and Technology, The Australian National University (2000).

[38] Beymer et al., "Eye Gaze Tracking Using an Active Stereo Head", Proceedings of the 2003 Computer Society Conference on Computer Vision and Pattern Recognition (CPVR '03) 1063-6919 (2005).

[39] Zhu et al., "Subpixel Eye Gaze Tracking", Interactive Systems Laboratory, Carnegie Mellon University, Proceedings of the Fifth IEEE International Conference on Automatic Face and Gesture Recognition, 131-137 (2002).

[40] Reale et al., "Pointing with the Eyes: Gaze Estimation Using a Static/Active Camera System and 3D Iris Disk Model", Department of Computer Science, State University of New York, ICME (2010). [41] Ji et al., "Real-Time Eye, Gaze, and Face Pose Tracking for Monitoring Driver Vigilance", Real-Time Imaging, Vol. 8, pp. 357-377 (2002).

[42] Traxler et al., "Plausibility and the Processing of Unbounded Dependencies: An Eye-Tracking Study", Journal of Memory and Language, Vol. 35, Article No. 0025, pp. 454-475 (1996).

[43] Vick et al., "Learning and Limits of Use of Eye Gaze by Capuchin Monkeys (Cebus paella) in an Object-Choice Task", Journal of Comparative Psychology, Vol. 114, No. 2, pp. 200-207 (2000).

[44] Chen et al., "A Robust 3D Eye Gaze Tracking System Using Noise Reduction", Rensselaer Polytechnic Institute, ACM ETRA (2008).

[45] Cornelissen et al., "The Eyelink Toolbos: Eye Tracking with MATLAB and the Psychophysics Toolbox", Laboratory of Experimental Ophthalmology, School for Behavioral and Cognitive Neurosciences, University of Groningen, The Netherlands (2002).

[46] Collewijn et al., "Effect of Freeing the Head on Eye Movement Characteristics during Three-Dimensional Shifts of Gaze and Tracking" Ch. 64, in A. Berthoz, Werner Graf, Pierre Paul Vidal, *Language Arts & Disciplines* (1992).

[47] Law et al., "Eye Gaze Patterns Differentiate Novice and Experts in a Virtual Laparoscopic Surgery Training Environment", School of Computing Science and Kinesiology, Simon Fraser University ACM (2004).

[48] Morimoto et al., "Pupil Detection and Tracking Using Multiple Light Sources", IBM Almaden Research Center, Technical Report RJ-10117, Image Vision Comput., 2000: 331-335 (2000).

[49] Sugioka et al., "Noncontact Video-Based Eye-Gaze Detection Method Allowing Large Head Displacements", IEEE Conference in Engineering in Medicine and Biology Society, 2.7.1: Interfaces for Control, 1996.

[50] Li et al., "Starburst: A hybrid algorithm for video-based eye tracking combining feature-based and model-based approaches", Human Computer Interaction Program, Iowa State University IEEE CVPRW (2005).

[51] Thompson et al., "The Relationship Between Eye Gaze and Verb Agreement in American Sign Language: An Eye-Tracking Study", Natural Language & Linguistic Theory, Vol. 24, pp. 571-604 (2006).

[52] Lyons et al., "Development of a Hybrid Hands-Off Human Computer Interface Based on Electromyogram Signals and Eye-Gaze Tracking", Electrical and Computer Engineering Department, Florida International University, IEEE Engineering in Medicine and Biology Society (2001).

[53] Chin et al., "Integrated electromyogram and eye-gaze tracking cursor control system for computer users with motor disabilities", Journal of Rehabilitation Research & Development, Vol. 45, No. 1, pp. 161-174 (2008).

[54] Zhu et al., "Novel Eye Gaze Tracking Techniques Under Natural Head Movement", IEEE Transactions on Biomedical Engineering 54(12):2246-2260 (2007).

[55] Perez et al., "A Precise Eye-Gaze Detection and Tracking System", Department of Architecture and Information Systems Technology (DATSI), Polytechnic University of Madrid WSCG (2003).

[56] Ohno et al., "FreeGaze: A Gaze Tracking System for Everyday Gaze Interaction", Proceedings of ETRA 2002 Symposium: eye tracking research & applications, pp. 125-132 (2002).

[57] Vertegaal et al., "Explaining Effects of Eye Gaze on Mediated Group Conversations: Amount or Synchronization?" Human Media Lab, CISC, Queens University, Canada ACM CSCW 2002 (2003).

[58] Garau et al., "The Impact of Avatar Realism and Eye Gaze Control on Perceived Quality of Communication in a Shared Immersive Virtual Environment", Department of Computer Science, University College London ACM CHI (2003).

[59] Ohno et al., "Just Blink Your Eyes: A Head-Free Gaze Tracking System", NTT Communication Science Labs and ATR Media Information Science Labs, ACM CHI 2003 (2003).

[60] Heinzmann et al., "3-D Facial Pose and Gaze Point Estimation using a Robust Real-Time Tracking Paradigm", Department of Systems Engineering, Australian National University, Proceedings of the IEEE International Conference on Automatic Face and Gesture Recognition (1998).

[61] Baluja et al., "Non-Intrusive Gaze Tracking Using Artificial Neural Networks", School of Computer Science, Carnegie Mellon University CMU-CS-94-102 (1994).

[62] Vertegaal et al., "Eye Gaze Patterns in Conversations: There is More to Conversational Agents Than Meets the Eyes", SIGCHI '01 (2001).

[63] Shih et al., "A Novel Approach to 3-D Gaze Tracking Using Stereo Cameras", Department of Computer Science and Information Engineering, National Chi Nan University, IEEE Transactions on Systems, Man, and Cybernetics, Part B: Cybernetics 34(1):234-245 (2004).

[64] Stiefelhagen et al., "A Model-Based Gaze Tracking System", Interactive System Laboratories, Carnegie Mellon University, IEEDE Trans. Intelligence and Systems, 304-310 (1996).

[65] Ishikawa et al., "Passive Driver Gaze Tracking with Active Appearance Models", The Robotics Institute, Carnegie Mellon University CMU-RI-TR-04-08, Proceedings of the 11th World Congress on Intelligent Transportation Systems (2004).

[66] Wang et al., "Eye Gaze Estimation from a Single Image of One Eye", IEEE International Conference on Computer Vision ICCV (2003).

[67] Sibert et al., "Evaluation of Eye Gaze Interaction", Human-Computer Interaction Lab, Naval Research Laboratory and Department of Electrical Engineering & Computer Science, Tufts University ACM (2000).

[68] Zhu et al., "Eye and Gaze Tracking for Interactive Graphic Display", Machine Vision and Applications, Vol. 15, pp. 139-148 (2004).

[69] Stiefelhagen, Rainer, "Gaze Tracking for Multimodal Human-Computer Interaction" Thesis Institut fur Logik, Komplexitat and Deduktionssysteme (1996).

[70] Garau et al., "The Impact of Eye Gaze on Communication Using Humanoid Avatars", Department of Computer Science, University College London ACM (2001).

[71] Tan et al., "Appearance-based Eye Gaze Estimation", Proceedings of IEEE Workshop on Applications of Computer Vision (WACV '02) (2002).

[72] Shih et al., "A Calibration-Free Gaze Tracking Technique", Department of Computer Science and Information Engineering, National Chi Nan University, Proceedings of the 15th International Conference on Pattern Recognition, 201-204 (2000).

[73] Stiefelhagen et al., "Head Orientation and Gaze Direction in Meetings", Interactive Systems Laboratories, University of Karlsruhe and Carnegie Mellon University ACM (2002).

[74] Gee et al., "Determining the Gaze of Faces in Images", Department of Engineering, University of Cambridge, CUED/FINFENG/TR 174 (1994).

[75] Morimoto et al., "Keeping an Eye for HCI", SIB-GRAPHI '99, Brazilian Symposium in Computer Graphics and Image Proc., 171 (1999).

[76] Qvarfordt et al., "Conversing with the User Based on Eye-Gaze Patterns", CHI 2005, Papers: Eye Gaze and Multimodal Integration Patterns (2005).

[77] Colburn et al., "The Role of Eye Gaze in Avatar Mediated Conversational Interfaces", Microsoft Research, Microsoft Corporation MSR-TR-2000-81 (2000).

[78] Duchowski et al., "A Breadth-First Survey of Eye Tracking Applications", Behavior Research Methods, Instruments and Computers (2000).

[79] Jacob et al., "Eye Tracking in Advance Interface Design", Human-Computer Interaction Lab, Naval Research Laboratory (1995).

[80] Salvucci et al., "Identifying Fixations and Saccades in Eye-Tracking Protocols", Proceedings of the Eye Tracking Research and Applications Symposiums, pp. 71-78 ACM (2000).

[81] Jacob et al., "Eye Tracking in Human-Computer Interaction and Usability Research: Ready to Deliver the Promises", The Mind's Eye: Cognitive and Applied Aspects of Eye Movement Research (2003).

[82] Gee et al., "Non-Intrusive Gaze Tracking for Human-Computer Interaction", IEEE Proceedings Mechatronics and Machine Vision in Practice, pp. 112-117 (1994).

[82] Yoo, D. H.; et al. (2002) "Non-contact Eye Gaze Tracking System by Mapping of Corneal Reflections", Fifth IEEE Int. Conference on Automatic Face and Gesture Recognition.

[84] Wolfe, B. et al. "A Neural Network Approach to Tracking Eye Position", International Journal of Human-Computer Interaction, vol. 9 (1) pp. 59-79 (1997).

[85] K Talmi and J. Liu, "Eye and Gaze Tracking for Visually Controlled Interactive Stereoscopic Displays", Image Communication, vol. 14, No. 10, p. 799-810, 1999.

[86] J. Liu et al., "Three-dimensional PC: toward novel forms of human-computer interaction", in Three-Dimensional Video and Display: Devices and Systems SPIE CR76, Nov. 5-8, 2000, Boston, Mass., USA.

[87] Z. Zhang, "A Flexible New Technique for Camera Calibration", IEEE Transactions on Pattern Analysis and Machine Intelligence, vol. 22, No. 11, p1330-1334, 2000, also available as Technical Report MSR-TR-98-71, Microsoft Research, Microsoft Corporation, Redmond Wash., research.microsoft.com/.sup.about.zhang/Papers/TR98-71.pdf.

[88] P. J. Kennedy, "Point of Regard Tracking Device", IBM Technical Disclosure Bulletin vol. 34, No. 10A, March 1992.

[89] Eye Movement Equipment Database (EMED), University of Darby, ibs.derby.ac.uk/emed.

[90] A. T. Duchowski, Eye Tracking Methodology: Theory and Practice. Springer-Verlag, 2003.

[91] L. Young and D. Sheena, "Methods & designs: survey of eye movement recording methods," Behav. Res. Methods Instrum., vol. 5, pp. 397-429, 1975.

[92] R. Jacob and K. Karn, The Mind's Eye: Cognitive and Applied Aspects of Eye Movement Research. Amsterdam: Elsevier Science, 2003, ch. Eye Tracking in Human-Computer Interaction and Usability Research: Ready to Deliver the Promises (Section Commentary), pp. 573-605.

[93] T. Hutchinson, J. White, W. Martin, K. Reichert, and L. Frey, "Human-computer interaction using eye-gaze input," Systems, Man and Cybernetics, IEEE Transactions on, vol. 19, no. 6, pp. 1527-1534, November-December 1989.

[94] C. Hennessey, B. Noureddin, and P. Lawrence, "A single camera eye-gaze tracking system with free head motion," in Proceedings of the 2006 symposium on Eye tracking research & applications. New York, N.Y., USA: ACM Press, 2006, pp. 87-94.

[95] C. H. Morimoto, A. Amir, M. Flickner, "Detecting Eye Position and Gaze from a Single Camera and 2 Light Sources," 16th International Conference on Pattern Recognition (ICPR '02)-Volume 4, 2002, p. 40314.

[96] E. Guestrin and M. Eizenman, "General theory of remote gaze estimation using the pupil center and corneal reflections," Biomedical Engineering, IEEE Transactions on, vol. 53, no. 6, pp. 1124-1133, June 2006.

[97] A. T. Duchowski, V. Shivashankaraiah, T. Rawls, A. K. Gramopadhye, B. J. Melloy, and B. Kanki, "Binocular eye tracking in virtual reality for inspection training," in Proceedings of the 2000 symposium on Eye tracking research & applications. New York, N.Y., USA: ACM Press, 2000, pp. 89-96.

[98] K. Essig, M. Pomplun, and H. Ritter, "Application of a novel neural approach to 3d gaze tracking: Vergence eye-movements in autostereograms," in Proceedings of the 26th1 Meeting of the Cognitive Science Society, K. Forbus, D. Gentner, and T. Regier, Eds., 2004, pp. 357-362.

[99] K. Essig, M. Pomplun, and H. Ritter, "A neural network for 3d gaze recording with binocular eyetrackers," International Journal of Parallel, Emergent and Distributed Systems (accepted), 2006.

[100] Y.-M. Kwon and K.-W. Jeon, "Gaze computer interaction on stereo display," in Proceedings of the 2006 ACM SIGCHI international conference on Advances in computer entertainment technology. New York, N.Y., USA: ACM Press, 2006, p. 99.

[101] M. Halle, "Autostereoscopic displays and computer graphics," SIGGRAPH Comput. Graph., vol. 31, no. 2, pp. 58-62, 1997.

[102] Ambient Devices, Inc. Ambient Orb. www.ambientdevices.com, 2003.

[103] Bradley, A., and Thibos, L. (2003). Modeling Off-axis Vision I: the Optical Effects of Decentering Visual Targets or the Eye's Entrance Pupil. Report, School of Optometry, Indiana University, Bloomington, Ind.

[104] Forrester, J., Dick, A., McMenamin, P. and Lee, W. (1996) The Eye. Basic Sciences in Practice, W.B. Saunders, London.

[105] Guiard, Y. (1987). Asymmetric division of labor in human skilled bimanual action: The kinematic chain as a model. Journal of Motor Behavior 19:486-517.

[106] Gullstrand. (1955). Schematic Eye. In Visual Optics, H. H. Emsley (Ed), $3^{rd}$ edition, p. 348, Butterworth, Scarborough, Ontario.

[107] Heijde, R. G. L. van der, Dubbelman, M. and Weeber, H. A. The Shape of the Back Surface of the Cornea. S. Afr. Optom. 62 (3), 132. (2003).

[108] Mamuji, A. et al. (2003). AuraLamp: Contextual Speech Recognition in an Eye Contact Sensing Light Appliance. In Extended Abstracts of Ubicomp '03, Seattle, 2003.

[109] Olsen T., Olesen H., Thiml K., Corydon L. (1992). Prediction of Pseudophakic Anterior Chamber Depth with the Newer IOL Calculation Formulas. J. Cataract Refract. Surg., 1992 18: 280-285.

[110] Rabsilber T. M., Becker K. A., Frisch I. B., Auffarth G. U. (2003). Anterior Chamber Depth in Relation to Refractive Status Measured with the Orbscan II Topography System. J. Cataract Refract. Surg., 2003 Nov. 29(11): 2115-21. Shell, J. S.,

[111] Vertegaal, R., Cheng, D., Skaburskis, A. W., Sohn, C., Stewart, A. J., Aoudeh, O., Dickie, C. (2003). ECSGlasses and EyePliances: Using Attention to Open Sociable Windows of Interaction. In Proceedings of ACM Eye Tracking Research and Applications Symposium '04, San Antonio, Tex.

[112] Velichkovsky, B. M. and Hansen, J. P. (1996). New technological windows to mind: There is more in eyes and brains for human computer interaction. In Proceedings of ACM CHI '96 Conference on Human Factors in Computing Systems. Vancouver, Canada: ACM, 1996, pp. 496-503.

What is claimed is:

1. A method for gaze direction estimation, comprising:
   detecting at least one iris of an eye in an image;
   estimating a 3D eyeball center and radius, a fovea position, and an iris center;
   determining an estimated eye gaze directional vector between the fovea position and the iris center, based on at least the estimated 3D eyeball center and radius, fovea position, and iris center;
   calibrating the estimated eye gaze directional vector with respect to a known condition, by directing the eye to look into at least one camera and toward at least one calibration point;
   solving for $t_a$ using the following quartic equations:

$St_a^4 + Tt_a^3 + Ut_a^2 + Vt_a + W = 0$, $S = Y^2$, $T = -2TZ - 2(A*B)XY$, $U = Z^2 + 2(A*B)XY - r^2y^2 + x^2$, $V 2r^2 YZ$, $W = -r^2 Z^2$, $X = (A \times B \times A) * P$, $Y = (A \times B \times A) * B$, $Z = (A \times B \times P) * B$;

wherein:
   r is a 3D eyeball radius,
   E is an estimate for the 3D eyeball center,
   E' is an estimate for the 3D iris center,
   P is a calibration point having a known 3D location,
   m1 and m2 are iris centers represented in the image,
   A and B are normalized vectors between m1 and m2 and the camera,
   $t_a$ and $t_b$ represent lengths such that $At_a = E$ and $Bt_b = E'$,
   wherein $\|At_a - Bt_b\| = r$ and point E' (or $Bt_b$) is a point of intersection between $C = At_a - P$ and B, equivalent to a point of intersection between B and a plane determined by point P and normal $N = (A \times B \times C)$, such that $$t_b = \frac{N \cdot P}{N \cdot B};$$

scaling A by $t_a$ and obtaining a 3D eyeball center estimate E for a given eyeball radius r; and
   estimating r based on a statistical calibration process.

2. The method according to claim 1, wherein a pair of eyes are detected in the image, and an eye gaze directional vector determined for each eye, further comprising determining at least one of a statistical composite of the eye gaze directional vector for each eye, and a selected eye gaze directional vector for one eye, to represent the gaze direction.

3. The method according to claim 1, further comprising determining an iris center V, a set of iris contour vectors $C_i$, and determining an optical axis G such that it is parallel to V and the dot product of G and each $C_i$ is aveDot, using the following linear equations:

$$\begin{bmatrix} C_0^X & C_0^Y & C_0^Z \\ \ldots & \ldots & \ldots \\ C_N^X & C_N^Y & C_N^Z \\ V^X & V^Y & V^Z \\ \ldots & \ldots & \ldots \\ V^X & V^Y & V^Z \end{bmatrix} \begin{bmatrix} G^X \\ G^Y \\ G^Z \end{bmatrix} = \begin{bmatrix} aveDot \\ \ldots \\ aveDot \\ 1 \\ \ldots \\ 1 \end{bmatrix}$$

in which aveDot, V, and the constant 1 are repeated in their respective matrices N times for N contour vectors $C_i$.

4. The method according to claim 1, further comprising detecting a face, and based on the detected face, detecting an eye of the face.

5. The method according to claim 4, further comprising employing a lighting invariant linear-time process and selecting a set of Haar-like features.

6. The method according to claim 5, wherein the Haar-like features are selected using an adaptive boosting process.

7. The method according to claim 4, further comprising terrain mapping the detected face, extracting pit locations as pupil candidates, and selecting an eye pair using a Gaussian Mixture Model (GMM) and facial model-based heuristics.

8. The method according to claim 1, wherein a color filtered channel of an image is selectively processed to detect the iris.

9. The method according to claim 1, wherein the image is searched for specular reflections off the eye.

10. The method according to claim 1, further comprising iteratively seeking the best estimate of eyeball center E and the fovea location, using a binary search process within a range about the initial estimate of E.

11. The method according to claim 1, further comprising:
defining a search region around the estimated iris position, and blurring a grayscale image;
extracting gradient magnitudes and directions from the blurred image;
given a normalized 2D vector H that goes from the iris center estimate to the 2D eyeball center, shooting rays R, outwards around H;
for all pixels (within search region) along each ray, computing $score_{i,j}=m_{i,j}*(dot(H, D_{i,j})>0.5)$, where i is a ray index, j is a pixel index, $m_{i,j}$ is a gradient magnitude, and $D_{i,j}$ is a normalized gradient direction vector from dark to light pixels;
choosing a highest scoring pixel along each ray as a potential iris contour point;
removing duplicate points caused by overlapping rays;
mapping 2D iris contour points to an eyeball sphere by converting them into 3D perspective vectors and intersecting them with the estimated eyeball sphere, wherein a normalized vector going from the eyeball center to one of those intersection points is an iris contour vector $C_i$;
computing an average dot product between an eye optical axis and each $C_i$ to estimate a 3D iris radius;
approximating an optical gaze vector by intersecting the 2D iris center with the eyeball sphere, subtracting the eyeball center, and normalizing the result, to provide vector V;
obtaining an average of the dot products (aveDot) between V and each $C_i$, to define the iris disk;
solving the following linear equations:

$$\begin{bmatrix} C_0^X & C_0^Y & C_0^Z \\ \cdots & \cdots & \cdots \\ C_N^X & C_N^Y & C_N^Z \\ V^X & V^Y & V^Z \\ \cdots & \cdots & \cdots \\ V^X & V^Y & V^Z \end{bmatrix} \begin{bmatrix} G^X \\ G^Y \\ G^Z \end{bmatrix} = \begin{bmatrix} aveDot \\ \cdots \\ aveDot \\ 1 \\ \cdots \\ 1 \end{bmatrix};$$

determining the visual axis by rotating the fovea location offset based on an optical axis G, intersecting the optical axis with the eyeball sphere to get a new estimate for the 3D iris center; and
determining a normalized vector taken from the fovea location to the new estimate of the iris center as the gaze direction.

12. The method according to claim 1, further comprising mapping the eye gaze directional vector to a display coordinate of a display device.

13. An apparatus for determining an eye gaze direction, comprising:
a camera, a display screen; and
an automated processor, configured to:
detect at least one iris of an eye in an image from the camera, to estimate a 3D eyeball center and radius, a fovea position, and an iris center;
estimate an eye gaze directional vector between the fovea position and the iris center;
calibrate the eye gaze directional vector estimate of the eye by acquiring at least one image each of the eye directed looking into at least one camera and of the eye directed looking toward at least one calibration point;
solve for $t_a$ using the following quartic equations:

$$St_a^4 + Tt_a^3 + Ut_a^2 + Vt_a + W = 0,$$

$$S = Y^2,$$

$$T = -2TZ - 2(A*B)XY,$$

$$U = Z^2 + 2(A*B)XY - r^2y^2 + x^2,$$

$$V = 2r^2YZ,$$

$$W = -r^2Z^2,$$

$$X = (A \times B \times A)*P,$$

$$Y = (A \times B \times A)*B,$$

$$Z = (A \times B \times P)*B;$$

wherein:
r is a 3D eyeball radius,
E is an estimate for the 3D eyeball center,
E' is an estimate for the 3D iris center,
P is a calibration point having a known 3D location,
m1 and m2 are iris centers represented in the image,
A and B are normalized vectors between m1 and m2 and the camera,
$t_a$ and $t_b$ represent lengths such that $At_a=E$ and $Bt_b=E'$,
wherein $\|At_a - Bt_b\| = r$ and point E' (or $Bt_b$) is a point of intersection between $C=At_a-P$ and B, equivalent to a point of intersection between B and a plane determined by point P and normal $N=(A \times B \times C)$, such that $$t_b = \frac{N \cdot P}{N \cdot B};$$

scale A by $t_a$ and obtaining a 3D eyeball center estimate E for a given eyeball radius r; and
estimate r based on a statistical calibration process.

14. The apparatus according to claim 13, wherein the automated processor is configured to detect a pair of eyes in the image, determine an eye gaze directional vector for each eye, and determine at least one of a statistical composite of the eye gaze directional vector for each eye and a selected eye gaze directional vector for one eye to represent the eye gaze direction.

15. The apparatus according to claim 13, wherein the automated processor is configured to determine an iris center V, a set of iris contour vectors $C_i$, and to determine an optical axis G such that it is parallel to V and the dot product of G and each $C_i$ is aveDot, using the following linear equations:

$$\begin{bmatrix} C_0^X & C_0^Y & C_0^Z \\ \cdots & \cdots & \cdots \\ C_N^X & C_N^Y & C_N^Z \\ V^X & V^Y & V^Z \\ \cdots & \cdots & \cdots \\ V^X & V^Y & V^Z \end{bmatrix} \begin{bmatrix} G^X \\ G^Y \\ G^Z \end{bmatrix} = \begin{bmatrix} aveDot \\ \cdots \\ aveDot \\ 1 \\ \cdots \\ 1 \end{bmatrix}$$

in which aveDot, V, and the constant 1 are repeated in their respective matrices N times for N contour vectors $C_i$.

16. The apparatus according to claim 15, wherein the automated processor is further configured to detect a face, and based on the detected face, to detect an eye of the face.

17. The apparatus according to claim 16, wherein the automated processor is further configured to employ a lighting invariant linear-time process and to select a set of Haar-like features.

18. The apparatus according to claim 17, wherein the automated processor is further configured to select the Haar-like features using an adaptive boosting process.

19. The apparatus according to claim 16, wherein the automated processor is further configured to terrain map the detected face, extract pit locations as pupil candidates, and select an eye pair using a Gaussian Mixture Model (GMM) and facial model-based heuristics.

20. The apparatus according to claim 13, wherein the automated processor is further configured to selectively process a color filtered channel of an image to detect the iris.

21. The apparatus according to claim 13, wherein the automated processor is further configured to search the image for specular reflections off the eye.

22. The apparatus according to claim 13, wherein the automated processor is further configured to iteratively seek the best estimate of eyeball center E and the fovea location, using a binary search process within a range about the initial estimate of E.

23. The apparatus according to claim 13, wherein the automated processor is further configured to:
define a search region around the estimated iris position, and blurring a grayscale image;
extract gradient magnitudes and directions from the blurred image;
given a normalized 2D vector H that goes from the iris center estimate to the 2D eyeball center, shoot rays $R_i$ outwards around H;
for all pixels (within search region) along each ray, compute $score_{i,j} = m_{i,j} * (dot(H, D_{i,j}) > 0.5)$, where i is a ray index, j is a pixel index, $m_{i,j}$ is a gradient magnitude, and $D_{i,j}$ is a normalized gradient direction vector from dark to light pixels;
choose a highest scoring pixel along each ray as a potential iris contour point;
remove duplicate points caused by overlapping rays;
map 2D iris contour points to an eyeball sphere by converting them into 3D perspective vectors and intersecting them with the estimated eyeball sphere, wherein a normalized vector going from the eyeball center to one of those intersection points is an iris contour vector $C_i$;
compute an average dot product between an eye optical axis and each $C_i$ to estimate a 3D iris radius;
approximate an optical gaze vector by intersecting the 2D iris center with the eyeball sphere, subtracting the eyeball center, and normalizing the result, to provide vector V;
obtain an average of the dot products (aveDot) between V and each $C_i$, to define the iris disk;
solve the following linear equations:

$$\begin{bmatrix} C_0^X & C_0^Y & C_0^Z \\ \cdots & \cdots & \cdots \\ C_N^X & C_N^Y & C_N^Z \\ V^X & V^Y & V^Z \\ \cdots & \cdots & \cdots \\ V^X & V^Y & V^Z \end{bmatrix} \begin{bmatrix} G^X \\ G^Y \\ G^Z \end{bmatrix} = \begin{bmatrix} aveDot \\ \cdots \\ aveDot \\ 1 \\ \cdots \\ 1 \end{bmatrix};$$

determine the visual axis by rotating the fovea location offset based on an optical axis G, intersecting the optical axis with the eyeball sphere to get a new estimate for the 3D iris center; and
determine a normalized vector taken from the fovea location to the new estimate of the iris center as the gaze direction.

24. The apparatus according to claim 13, wherein the automated processor is further configured to map the eye gaze directional vector to a display coordinate of a display device.

25. The apparatus according to claim 24, wherein the automated processor is further configured to define a cursor location associated with the display coordinate.

26. A method for gaze direction estimation, comprising:
detecting at least one iris of an eye in an image;
estimating a 3D eyeball center and radius, a fovea position, and an iris center;
determining an estimated eye gaze directional vector between the fovea position and the iris center, based on at least the estimated 3D eyeball center and radius, the estimated fovea position, and the estimated iris center,
wherein the 3D eyeball center and radius, the fovea position, and the iris center upon which the estimated eye gaze directional vector is based are calibrated by imaging the eye while directing the eye to look into at least one camera and toward at least one calibration point;
solving for $t_a$ using the following quartic equations:

$St_a^4 + Tt_a^3 + Ut_a^2 + Vt_a + W = 0,$ $S = Y^2,$ $T = -2TZ - 2(A*B)XY,$ $U = Z^2 + 2(A*B)XY - r^2y + x^2,$ $V = 2r^2YZ,$ $W = -r^2Z^2,$ $X = (A \times B \times A)*P,$ $Y = (A \times B \times A)*B,$ $Z = (A \times B \times P)*B;$ wherein:
r is a 3D eyeball radius,
E is an estimate for the 3D eyeball center,
E' is an estimate for the 3D iris center,
P is a calibration point having a known 3D location,
m1 and m2 are iris centers represented in the image,
A and B are normalized vectors between m1 and m2 and the camera,
$t_a$ and $t_b$ represent lengths such that $At_a = E$ and $Bt_b = E'$, wherein $\|At_a - Bt_b\| = r$ and point E' (or $Bt_b$) is a point of intersection between $C = At_a - P$ and B, equivalent to a point of intersection between B and a plane determined by point P and normal $N = (A \times B \times C)$, such that $$t_b = \frac{N \cdot P}{N \cdot B};$$

scaling A by $t_a$ and obtaining a 3D eyeball center estimate E for a given eyeball radius r; and estimating r based on a statistical calibration process.

27. The method according to claim 26, wherein a pair of eyes are detected in the image, and an eye gaze directional vector determined for each eye, further comprising determining at least one of a statistical composite of the eye gaze directional vector for each eye, and a selected eye gaze directional vector for one eye, to represent the gaze direction.

28. The method according to claim 26, further comprising determining an iris center V, a set of iris contour vectors $C_i$, and determining an optical axis G such that it is parallel to V and the dot product of G and each $C_i$ is aveDot, using the following linear equations:

$$\begin{bmatrix} C_0^X & C_0^Y & C_0^Z \\ \cdots & \cdots & \cdots \\ C_N^X & C_N^Y & C_N^Z \\ V^X & V^Y & V^Z \\ \cdots & \cdots & \cdots \\ V^X & V^Y & V^Z \end{bmatrix} \begin{bmatrix} G^X \\ G^Y \\ G^Z \end{bmatrix} = \begin{bmatrix} aveDot \\ \cdots \\ aveDot \\ 1 \\ \cdots \\ 1 \end{bmatrix}$$

in which aveDot, V, and the constant 1 are repeated in their respective matrices N times for N contour vectors $C_i$.

29. The method according to claim 26, further comprising detecting a face, and based on the detected face, detecting an eye of the face by employing a lighting invariant linear-time process and selecting a set of Haar-like features using an adaptive boosting process.

* * * * *